United States Patent

[11] 3,580,315

[72] Inventor Carl Schnell
 Winterbach near Schorndorf-
 Wurttemberg, Germany
[21] Appl. No. 795,912
[22] Filed Feb. 3, 1969
 P 16 32 883.9
 SCH 36,675
 SCH 37,216
 P 15 32 007.7
[45] Patented May 25, 1971
[73] Assignee The Griffith Laboratories, Inc.
 Chicago, Ill.
[32] Priority Mar. 8, 1968, Mar. 11, 1965, June 1, 1965,
 Sept. 29, 1965
[33] Germany
[31] Continuation-in-part of application Ser. No.
 532,602, Mar. 8, 1966, now abandoned.

[54] COMMINUTING MACHINE
 30 Claims, 17 Drawing Figs.
[52] U.S. Cl....................................................... 146/79,
 146/182, 146/192
[51] Int. Cl....................................................... B02c 18/06
[50] Field of Search........................................... 146/192,
 68, 182, 79

[56] References Cited
UNITED STATES PATENTS
3,108,626 10/1963 Schmook, Jr. et al. ....... 146/192
3,313,332 4/1967 Stephan et al. ............... 146/192

Primary Examiner—Willie G. Abercrombie
Attorney—Merriam, Marshall, Shapiro and Klose ABSTRACT: Comminuting apparatus for comminuting or precomminuting materials, particularly food products, under continuous circulating conditions and, preferably, under deaerating conditions. This apparatus can be used effectively in conjunction or combination with additional comminuting apparatus which more finely comminutes materials previously comminuted or precomminuted in said first-mentioned comminuting apparatus.

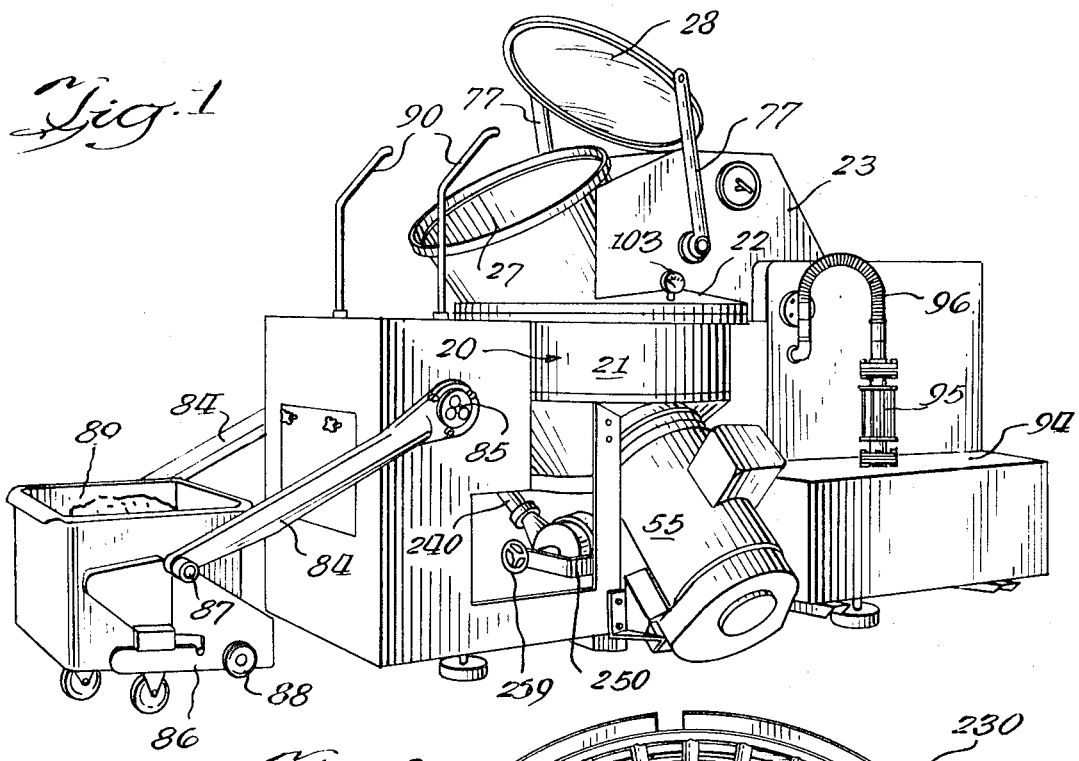
Fig. 1
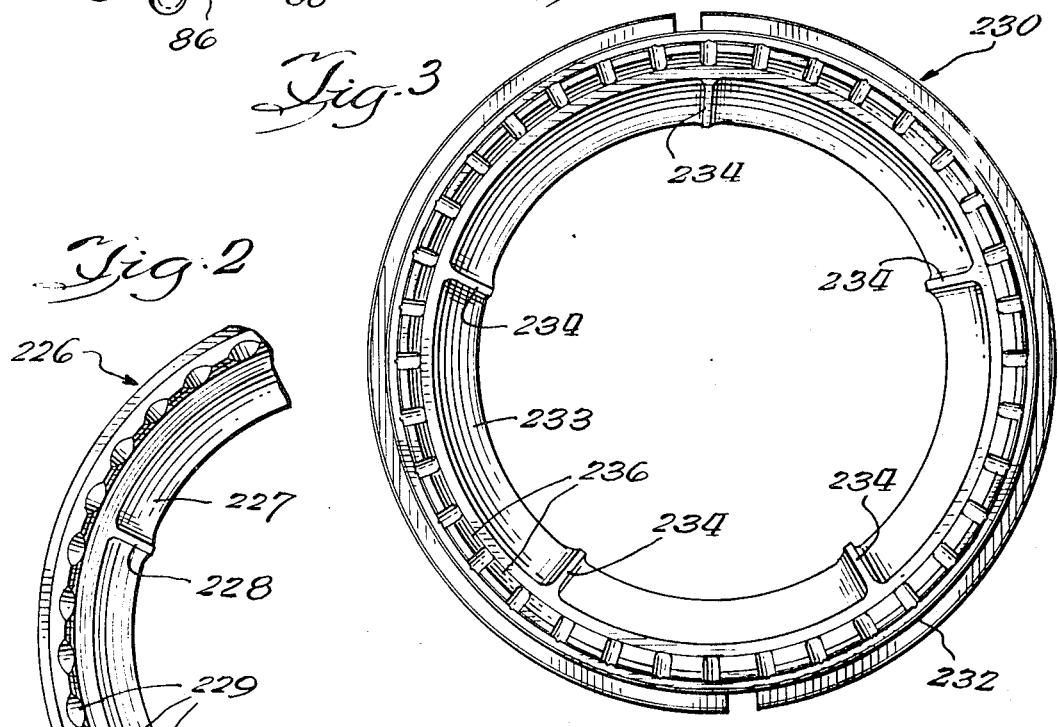
Fig. 2
Fig. 3
INVENTOR
Carl Schnell
BY Merriam, Marshall, Shapiro & Klose
ATTORNEYS

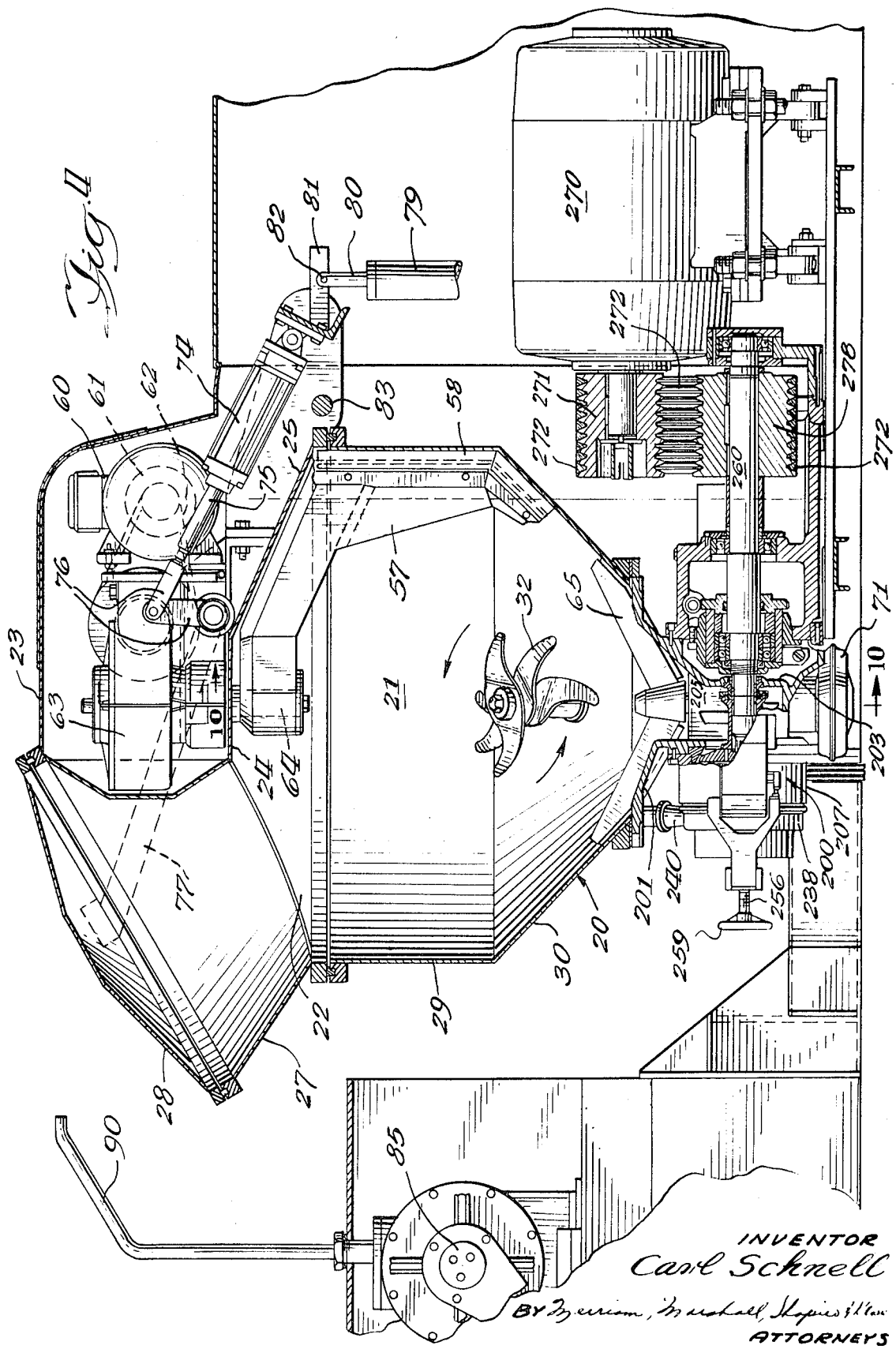

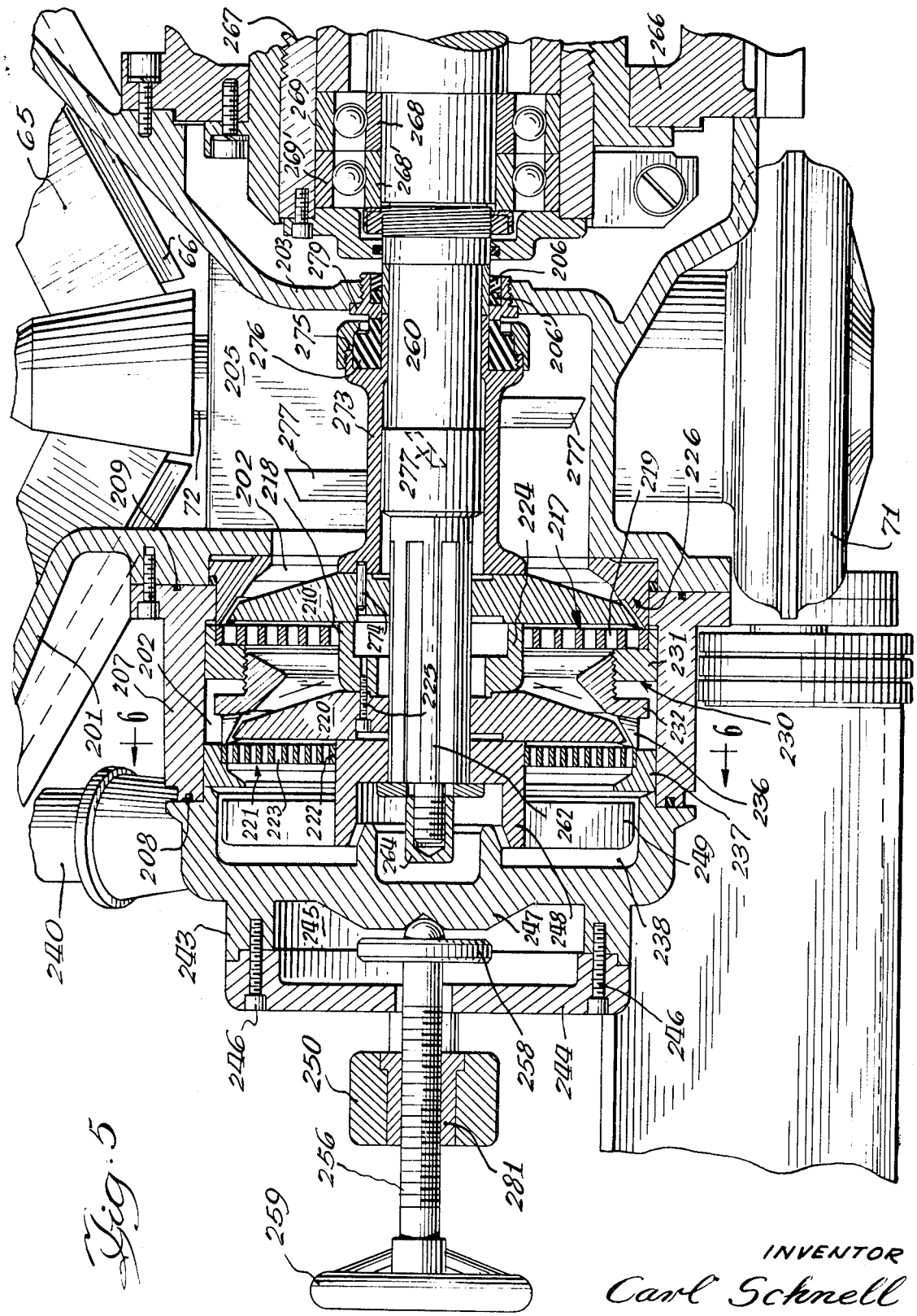

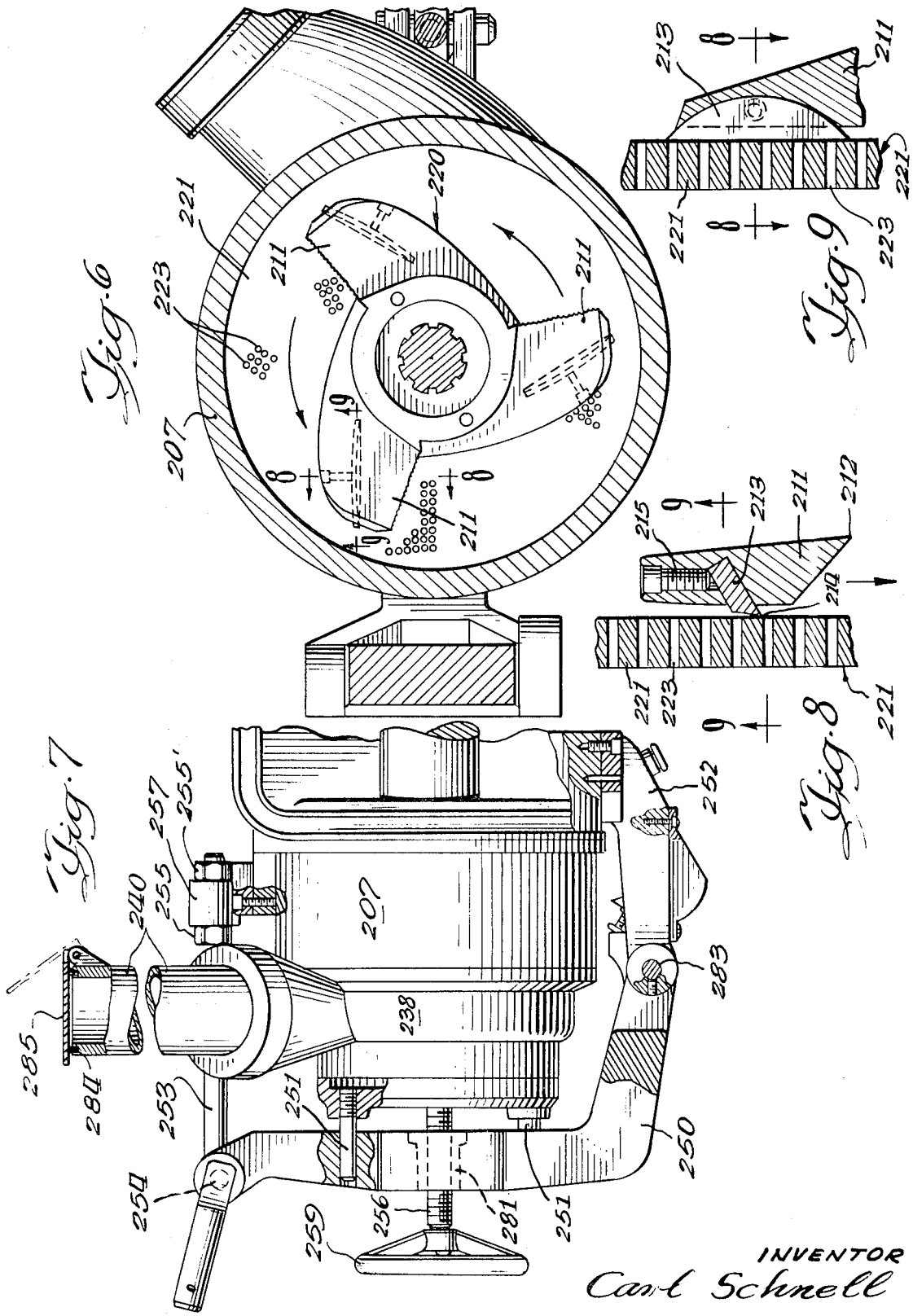

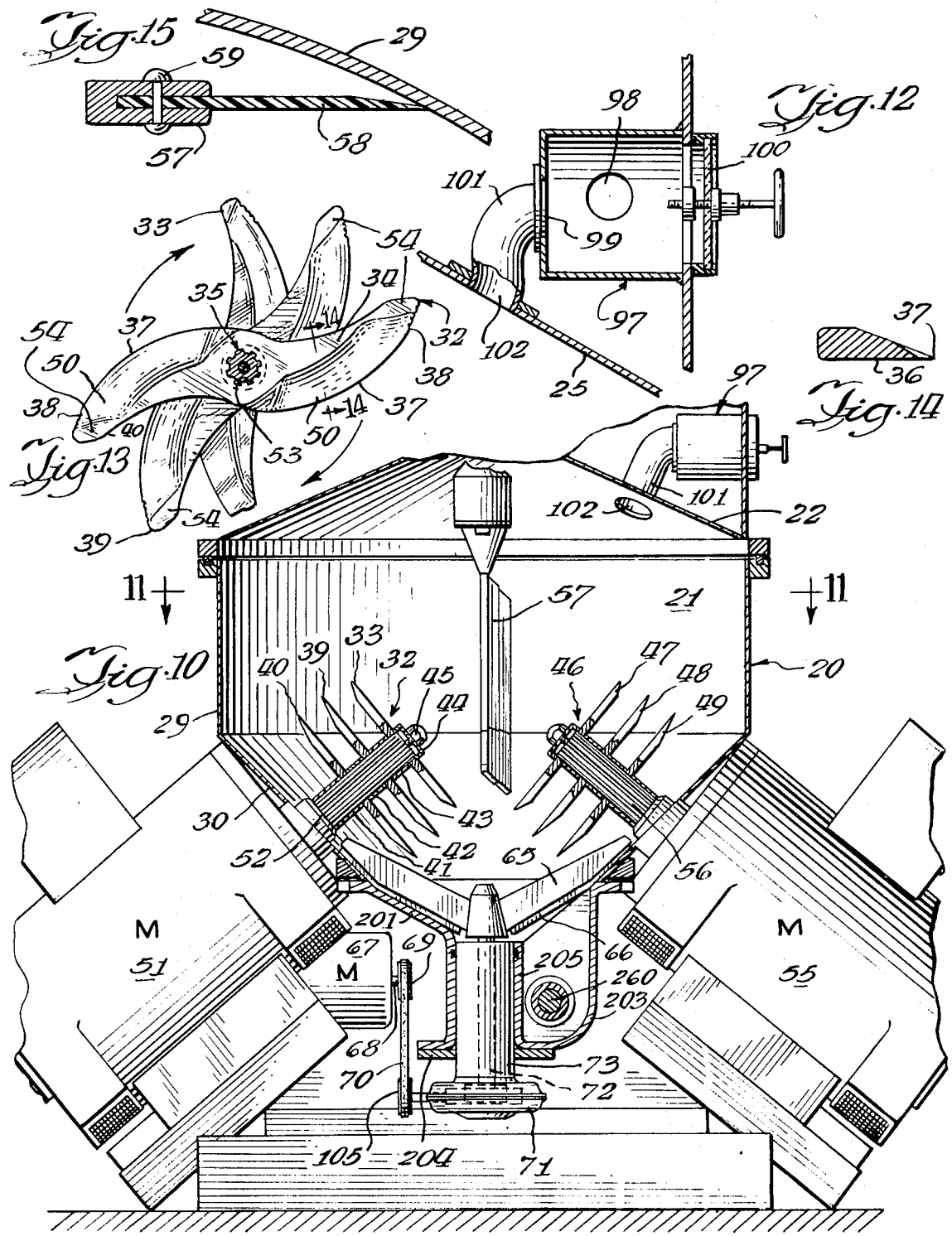

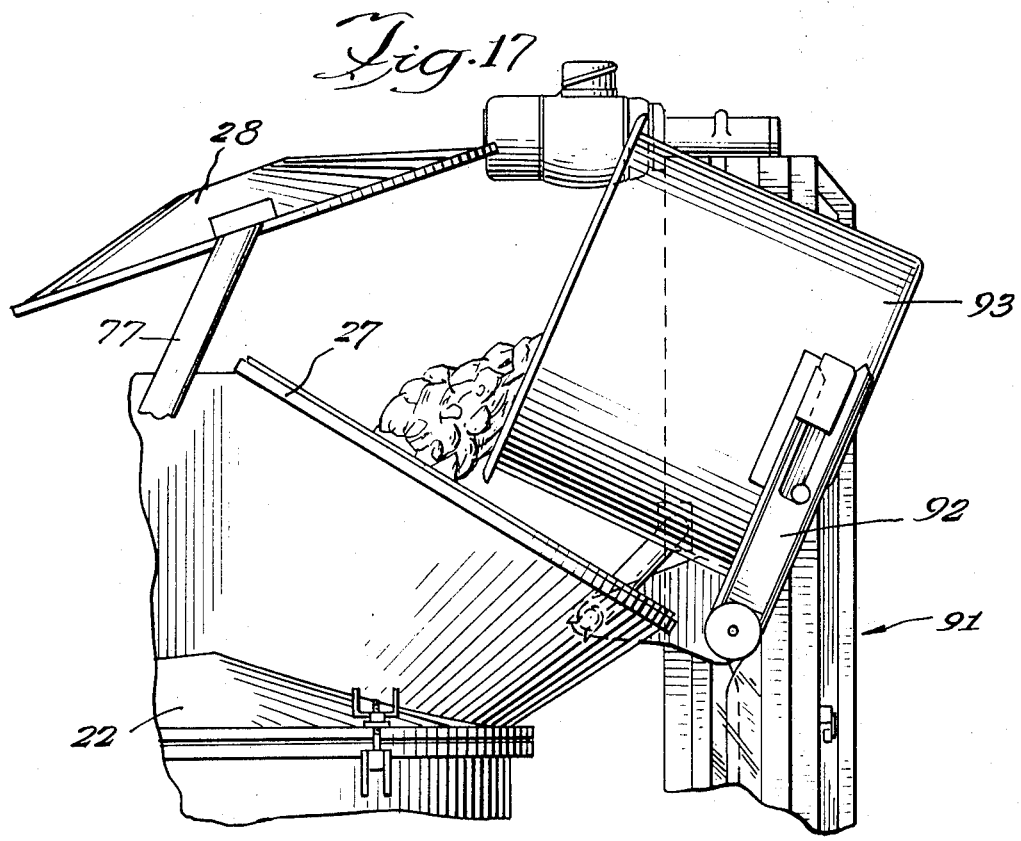
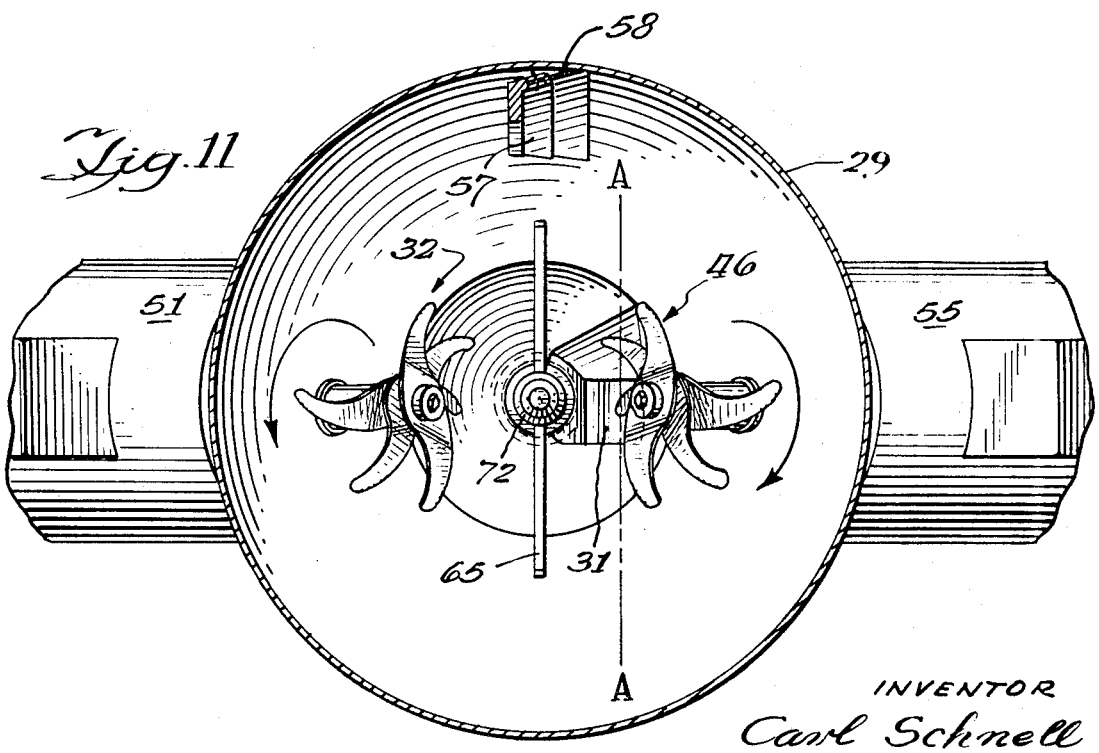

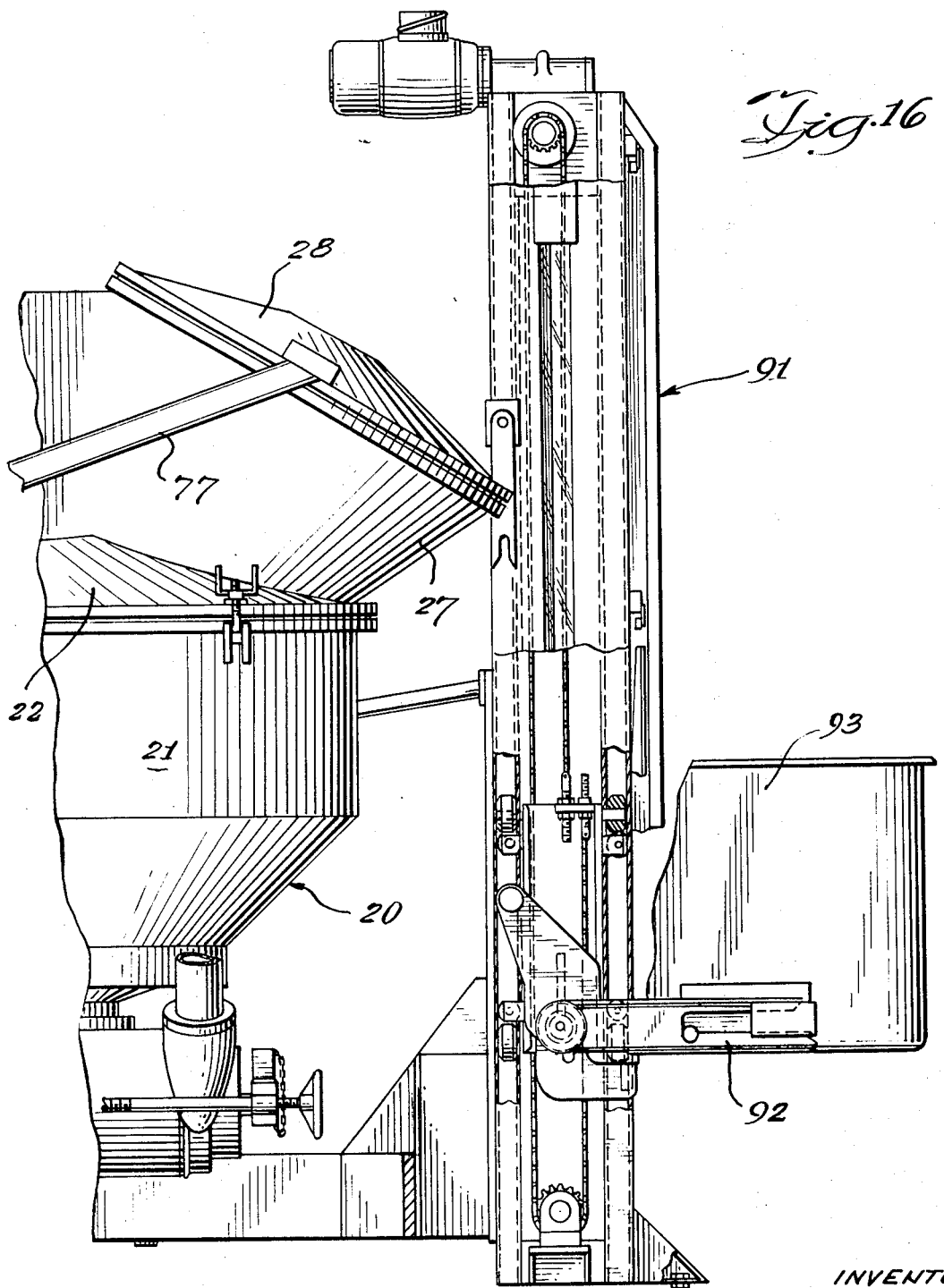

COMMINUTING MACHINE

This application is a continuation-in-part of my copending application Ser. No. 532,602, filed Mar. 8, 1966, now abandoned.

This invention relates to comminuting apparatus and methods suitable for use in producing comminuted materials, especially comestible agricultural and animal products, including meat products or mixes used for making meat emulsions for sausages, balogna, wieners, and the like.

MEAT EMULSIONS

In the past, meat material (the terms meat material, meat product or meat mix include meat alone or meat used in conjunction with other materials) for sausages, balogna, wieners, and the like were commonly divided or comminuted in an auger type grinder, followed by treatment in a mixer or blender or further comminution in a Silent Cutter or chopper. In using such machines, particularly the Silent Cutter, it has been common practice for air to be introduced incidentally into meat products.

Later, the meat processing industry utilized high-speed, centrifugal, fine comminuting machines or emulsifiers, such as shown in U.S. Pats No. 3,044,514 and 3,304,976, to emulsify, without substantial ingress of air or excessive temperature rise and with high throughput, meat products that had been previously comminuted and/or blended with fat, moisture, seasoning and other additives in a grinder, chopper or Silent Cutter, or mixer or blender. Such fine comminuting machines produce an improved, finely comminuted or emulsified, substantially homogeneous meat emulsion in an unobvious manner without overheating the product. The resulting meat emulsion then is commonly fed to a stuffer that stuffs the meat emulsion into flexible food casings.

During emulsification of the meat mix in the fine comminutor, some air remains entrapped therein despite the fact that the machine may be operated so that the product being comminuted therein is sealed against the ingress of air.

DEAERATION OF MEAT EMULSIONS

As explained above, in the course of making meat emulsions such as are used in making sausages, bologna, wieners and the like, air gets entrapped in and remains in the meat material. Often the entrapped air is not uniformly distributed throughout the meat material, which provides a problem of weight control. The entrapped air can be found in such meat emulsions in the form of readily visible as well as microscopic bubbles which bulk-up meat emulsions by about 5 percent to 15 percent.

The meat processing industry has shown a great interest in the advantages which can be obtained by deaerating or vacuumizing meat emulsions so as to remove entrapped or occluded air.

It has been found that by removing air from meat emulsions, one can produce more dense products (at atmospheric pressure), often having a specific gravity greater than 1. This increase in density offers many advantages. It allows one, for example, to produce meat products having more consistent weight control, stuff more meat emulsion into casings, improve slicing yields and to reduce rework, obtain faster cooking and chilling, increase smokehouse capacity, obtain improved color, and achieve greater shelf life.

The extended shelf life which is obtained by removing air may be due to many factors, including minimized bacterial load and inhibited micro-organism growth.

Oxygen in meat materials promotes the growth of various strains of micro-organisms (e.g., bacteria, yeasts and molds) which cause meat to spoil. This of course reduces shelf life. Oxygen also tends to make the fat rancid and to attack desirable pigments and flavors. The presence of oxygen, for example, delays the onset of a stable cure color and can accelerate the facing of the color of meat products packaged in transparent films when such products are subjected to showcase lighting conditions; when air, which includes oxygen, is removed from meat emulsions, the emulsions can develop a deeper and more rapid color, and one can obtain a packaged product having a cure color of greater stability and extended shelf life, particularly when vacuum packaging is also used.

BRIEF DESCRIPTION OF COMMINUTING MACHINE OF THIS INVENTION

The precomminuting machine of this invention provides means for rapidly and continuously comminuting food products, including fresh or frozen meat materials and stiff or not so stiff meat mixes or products, while such products are undergoing continuous circulation or recirculation and mixing. When meat materials are precomminuted in the machine, there is minimal, if any, temperature rise of the meat despite the excellent degree of precomminution which is accomplished with this machine.

When the precomminuting machine directly and operatively communicates or connects with the fine comminuting machine to provide a single, composite or consolidated machine, then of course the precomminuted product can be directly and quickly fed from the precomminuting machine to the fine comminuting machine.

I have found that it is particularly advantageous to deaerate or vacuumize the food material in the precomminuting chamber while it is being precomminuted. This can be done by applying a vacuum to that chamber to remove entrapped or occluded air from the material (e.g., meat material) being precomminuted. This deaeration achieves the benefits described above with respect to deaerating or vacuumizing meat emulsions; however, these benefits are accomplished immediately prior to fine comminution or emulsification. This further augments the advantages previously achieved by deaerating after fine comminution and can obviate the need for later deaeration.

When the precomminuting and fine comminuting machines constitute a single, composite or consolidated machine, the deaerated precomminuted product can be readily fed to and further comminuted in the fine comminuting machine in the deaerated state, after which air can be excluded from the fine meat emulsion until the product is packaged.

Briefly, the precomminuting chamber subjects material in its precomminuting chamber to a turbulent, recirculating vortex action so that material which is comminuted by sets of powered, high-speed, heavy-duty, rotary propeller knives positioned along a recirculating sidewall of the chamber is continuously re-presented to the cutting action of the rotary knives, and subjected to to thorough mixing and recirculating in the chamber. During precomminution, there is no buildup or accumulation of material on the interior walls of the chamber. When air present in the chamber or entrapped in the material is removed by subjecting the chamber to deaeration (e.g., before or during precomminution), one may readily and quickly deaerate the material being precomminuted, the resulting product may be fed readily to the fine comminuting machine in a deaerated state, and further comminution or subdivision of the material or particles thereof can be conducted in the fine comminuting machine without the ingress of air. The precomminuting chamber thus serves as a reservoir for the fine comminuting machine.

Heavy-duty, rotary agitator means positioned in the precomminuting chamber assist in mixing material, preventing the buildup or accumulation of material on the interior of the precomminuting chamber, and in discharging material from the precomminuting chamber.

When meat material having frozen meat is fed into the precomminuting machine, the frozen meat should be cut first to about the size of one's fist in a conventional cutter, such as a Hydroflaker or Extructor machine. If the meat is not frozen (i.e., fresh meat), it may be fed directly into the precomminuting machine, provided the meat chunks do not weigh more than about 20 pounds.

In general, the fine comminuting machine includes a comminuting chamber with a feeding inlet portion, a comminuting chamber, and a discharge chamber (e.g., which may have a discharge rotor). During operation this machine is sealed against ingress of air and produces a continuous and moving hydraulic column of material (e.g., meat emulsion) which is free from ingress of air.

The fine comminuting machine may include powered shaft means extending from a motor to or into the comminuting chamber where it drives at least one, high-speed propelling knife, and, preferably, a centrifugal discharge rotor in the discharge chamber. Shaft means is sealably mounted during operation, thereby preventing the ingress of air when the machine is comminuting comestible products (e.g., meat emulsions). Means may be provided for facilitating easy access to the several parts mounted in the various chambers; such parts then may be readily removed from their respective chambers or positions, cleaned or replaced, and reassembled in their operating positions.

If desired, the fine comminuting machine, for example, may be constructed to provide either a single, high-speed, rotary propelling knife associated with a single perforate valve plate or a plurality of high-speed, rotary propelling knives operatively associated with their respective perforate plates. It has been found, in comminuting meat products, that the use of a plurality of rotary knives and associated perforate plates generally produces a finer textured product.

BRIEF DESCRIPTION OF THE DRAWINGS

Reference is now made to the accompanying drawings (portions of which are diagrammatic representations) in which my comminuting machine is illustrated.

In the drawings:

FIG. 1 is a side perspective view of a consolidated comminuting machine which combines a precomminuting machine having pivotal loading or feeding means and a fine comminuting machine which further comminutes or emulsifies material which have been precomminuted by the precomminuting machine;

FIG. 2 is a fragmentary plan view of the first, annular lug ring of the fine comminuting machine;

FIG. 3 is a plan view of the second, removable and adjustable, annular lug ring of the fine comminuting machine;

FIG. 4 is an enlarged, fragmentary, cross-sectional side view of the comminuting machine shown in FIG. 1;

FIG. 5 is an enlarged, fragmentary, cross-sectional side view, similar to FIG. 4, showing certain details of the fine comminuting machine now shown in FIG. 4.

FIG. 6 is a plan view of a portion of the comminuting chamber of the fine comminuting machine taken on line 6-6 of FIG. 5 and showing a second, high-speed propelling knife positioned in advance of its associated perforate valve plate (only a few of the holes in the plate are shown);

FIG. 7 is a plan view, partly in section, illustrating the mounting of the discharge chamber of the fine comminuting machine which enables that chamber to be moved selectively away from and toward the comminuting chamber, and the hinged flapper valve at the discharge end of the discharge nozzle;

FIG. 8 is an enlarged cross-sectional view of the knife and perforate plate taken on line 8-8 of FIG. 6;

FIG. 9 is a cross-sectional view taken on line 9-9 of FIG. 8;

FIG. 10 is an enlarged, fragmentary, cross-sectional front view of the precomminuting machine taken on line 10-10 of FIG. 4 (the two sets of rotary precomminuting knives are shown diagrammatically);

FIG. 11 is a fragmentary, cross-sectional plan view of the precomminuting machine taken on line 11-11 of FIG. 10;

FIG. 12 is an enlarged, fragmentary, cross-sectional view of the vacuum line trap shown in FIG. 10;

FIG. 13 is an enlarged, detailed fragmentary, bottom plan view of one set of rotary precomminuting knives shown in FIGS. 4, 10 (shown diagrammatically) and 11;

FIG. 14 is an enlarged, cross-sectional view of one of the lower precomminuting knife members taken on line 14-14 of FIG. 13;

FIG. 15 is an enlarged, fragmentary, cross-sectional plan view showing the wiping blade at the outer periphery of the upper rotary agitator contacting the interior of the upper cylindrical wall portion of the precomminuting chamber shown in FIGS. 4 and 10;

FIG. 16 is a fragmentary, cross-sectional, rear view of another embodiment of loading or feeding means which vertically lift the feeding bucket (shown in a lower position) to the feed inlet at the top of the precomminuting chamber by means of an elevator (the lifted bucket is pivoted toward the feed inlet); and, FIG. 17 is a fragmentary view of FIG. 16 showing the pivotal movement of the lifted bucket feeding or loading meat material through the feed inlet of the precomminuting chamber.

DETAILED DESCRIPTION OF CONSOLIDATED COMMINUTING MACHINE a. Precomminuting Machine

The particular illustrative precomminuting machine 20 illustrated herein includes or has associated therewith feeding means (e.g., pivotal or elevator feeding assemblies) which feed material through the feed inlet 27 of the pivotal cover member 22 of the precomminuting chamber 21, means for selectively removing and closing the sealing cap 28 to the feed inlet, means for pivotally opening and closing the cover 22 so one can gain access to the confines of the chamber, including the rotary knife and agitator means positioned in the chamber, and discharge outlet or opening 31 (see FIG. 11) at the bottom of the chamber which discharges precomminuted material into the feed inlet hopper 201 of the fine comminuting machine 200.

Referring first to the precomminuting chamber 21 shown in FIGS. 1, 4, 10 and 16, the chamber has a substantially frustoconical or funnel-shaped configuration and during precomminution can be sealed to prevent ingress of air and to maintain vacuum conditions.

The chamber 21 includes or has associated therewith, in communicating and adjoining relationship (see FIG. 4): a pivotal cover member 22 having structure positioned directly over the intermediate portion of the chamber which includes a flat top portion 24 and a downwardly and outwardly extending sloping sidewall portion 25 which has a circular inlet opening from which an upstanding wall extends to define a feed inlet 27; an intermediate portion having a cylindrical sidewall 29; and a lower portion which includes a downwardly and inwardly sloping, circular sidewall 30.

The upstanding wall which defines the feed inlet slopes about 30° relative to a horizontal plane; however, that angle can be varied. The angle of slope of the interior surfaces of the sloping sidewall 30 is about 45° relative to a horizontal plane, but that angle may be varied, for example, to a limited extent, to provide a slope of between 30° to 60°.

The sloping sidewall 30 is sealably and operatively connected to the downwardly and inwardly sloping, feed inlet hopper 201 of the fine comminuting machine 200. The neck portion 203 of the fine comminuting machine extends from the hopper and provides an inlet portion of the comminuting chamber of that machine (see FIGS. 4 and 5).

FIG. 4 shows a laterally extending housing portion 23 of the pivotal cover 22 which is affixed to the flat top portion 24 and sloping sidewall portion 25 of the cover and extends laterally therefrom. Pivotal movement of the housing portion 23 at point 83 pivots the entire cover as described later below.

A removable sealing cap 28 selectively opens (see FIGS. 1 and 17) and sealably closes the mouth of the feed inlet 27 (see FIGS. 4 and 16) in the manner described later below. When the cap is in the closed position, the cap seals the feed inlet against the ingress of air thereat into the chamber 21 or the loss of a vacuum in the chamber.

The lower portion of the chamber 21 is sealed against ingress of air by filling the feed inlet hopper 201 (across a cross section of the hopper) with material (which, when precomminuting meat material, may be precomminuted meat material from a previous run), or, as shown in my application Ser. No. 532,602, filed Mar. 8, 1966, can be sealed by sealing valve means which selectively opens or closes the lower portion of the chamber.

Two, separate stratified sets of oppositely positioned, spaced-apart, and separately powered, rotary, heavy-duty, high-speed, sturdy, centrifugal, counterrotating, propelling precomminuting knives 32 and 46 of the same construction are positioned along and inwardly of the sloping sidewall 30. If desired, more than two, spaced-apart sets of precomminuting knives (e.g., three or more sets of oppositely positioned or opposed, spaced-apart rotary knives may be spaced-apart about the sloping wall) may be used. When precomminuting some relatively fluid materials (not meat chunks) each of the sets of spaced-apart knives need not necessarily comprise a set of stratified knives, (As used herein, opposed or oppositely positioned sets of knives does not necessarily require that the sets of knives be spaced-apart circumferentially about 180° as shown in FIG. 11.)

By using a plurality of sets of high-speed rotary knives and sets which include stratified individual knife members, in conjunction with the circulating sloping sidewall 30, one is able to penetrate and distribute rotary knives well within the confines of the material in the chamber and to subject that material to constant and continuous recirculating precomminution while the material is being mixed with the assistance of agitator means.

The respective drive shafts 52 and 56 for each of the sets of knives 32 and 46, respectively, project from their respective electric motors 51 and 55 through the sloping sidewall 30 in substantially perpendicular relationship to that wall in the manner shown in FIG. 10 (FIG. 10 shows the individual knives diagrammatically, whereas their actual configuration is shown in FIGS. 4, 11 and 13). As used herein, the substantially perpendicular relationship of the drive shafts to the sidewall can vary up to or within, for example, approximately 25°—30° from a 90° relationship. The motors 51 and 55 and drive shafts 52 and 56 are mounted with respect to the sidewall so as not to allow the ingress of air thereat or the loss of vacuum conditions.

The drive shafts 52 and 56 for the sets of knives extend into the chamber and carry the individual knife members of each set (sets 32 and 46). More specifically, these shafts are splined along their length to receive and secure splined central axial openings of the individual knife members. A cylindrical threaded tip portion of reduced diameter at the outermost or free ends of each of these shafts receives a central opening of a hub which is secured in place by a threaded nut which is threadably secured to the threads at the outer end of the respective shafts.

The individual knife members of each set are substantially balanced in rotation along their length, and the secured knife members of each set of knives cross each other to provide in rotation a peripherally balanced set.

The lowermost side of lower knife member 40 shown in FIG. 13 has a substantially flat upper central and radially extending narrowing ribbed portion 34 which is perpendicular to its axis of rotation. Extending radially from the central and ribbed portion 34 of the lower side of the knife member 40 are flat, but tapered or chamfered surfaces 50 which slope from the substantially flat central and ribbed portion 34 away from the sloping sidewall 30 toward the cutting edges 37. The outermost ends or tips 54 (radially outwardly of the narrowing substantially flat ribs) of the lower side of knife member 40 taper radially, as well as rearwardly in rotation, toward the upper side of that knife member. The upper side 36 of the knife member 40 is substantially flat (it is somewhat thicker at the central portion) and is substantially perpendicular to the axis of rotation (see FIG. 14) and defines, with the tapered surfaces 50, cutting edges 37. These cutting edges 37 of the knife member 40 essentially lie in a plane perpendicular to the axis of rotation and have serrations 38 near their outer ends as shown in FIG. 13. The other two knife members (upper two knife members) of the same (39 and 33) or other set have the same general construction, although the tip-to-tip length (measured through the axis of rotation) of the upper knife members of each set is shorter than the lower two knife members of both sets (see FIG. 10).

As shown in FIG. 13 with respect to the shaft 52, and set of knives 32, the shaft is splined at 53, and the axial centers of the knife members 33, 39 and 40 have a splined opening that mate with the splined drive shaft 52 and are locked in rotation thereby. The splined configuration of the axial opening of the lower knife member 40 is shown at 35 in FIG. 13. The individual knife members 47, 48 and 49 of the other set of knives 46 are secured to their drive shaft 56 in a like manner. FIGS. 4 and 11 shown that the knife members of a particular set of knives are positioned so as not to be directly superimposed along their respective lengths (perpendicular to their axes of rotation); however, they could be directly superimposed along their lengths. The knife members of the sets of knives in FIGS. 4 and 11 thus resemble a clover leaf.

FIG. 10 shows tubular spacers 41, 42 and 43 for the set of knives 32. These discs have splined central openings which mate with the splined drive shaft 52 and space the knife members 33, 39 and 40 from the sloping sidewall 30. More specifically, spacers 42 and 43 space the knife members 33 and 39 relative to each other and the lower spacer 41 spaces the knife member 40 from the sloping sidewall 30. A hub 44 has a centrally located, axially extending hole through which the threaded reduced end of the drive shaft 52 extends. A threaded nut 45 fits over the hub 44 and is secured to the threaded reduced end of the shaft to secure the knife members 33, 39 and 40 and spacers 41, 42 and 43 in place. Similar spacers are used to space the knife members of the other set of knives 46 and a similar hub and nut secure that assembly in a like manner to the threaded end of the other drive shaft 56.

In comminuting meat material, it has been found desirable to load the chamber to at least almost cover the sets of knives and to actuate the motors 51 and 55 for each set of knives about 7—8 seconds apart because of the substantial amount of current required to start rotation of each set under conditions of load.

Each set of counterrotating knives induces a violent continuous recirculating vortex action to material (e.g., meat material) in the chamber 21, although cavitation appears to occur for very brief instances. The sets of knives propel material upon which they act centrifugally outwardly and downwardly toward the sloping sidewall 30, particularly that portion of the sidewall along which each set of knives is positioned and cooperate. The sloping sidewall 30 thus serves as a directional baffle or recirculating surface and coacts with the rotating sets of knives and directs the flow of material upwardly and centrally away from the sidewall and back to the nearby, rotating set of knives unless the material is directed to the other set of knives (e.g., by agitator means).

The material so directed is repeatedly re-presented to the cutting action of the sets of rotating knives; more specifically, the material is subjected again and again to the cutting action of the sets of rotating knives and at least in part or essentially to the same set of knives. Since the sets of knives rotate in a different direction relative to each other (each knife member of the same set rotates in the same direction), recirculated material moving relative to one set of knives which may cross or join the path of recirculated material from or being fed to another set of knives, will not be moving opposite to each other or substantially interfere with or block their respective general directions of movement.

Powered, rotary, heavy-duty agitators 57 and 65 are shown in FIG. 4 positioned above and below, respectively, the sets of rotary knives (32 and 46) and operate contiguous to the sidewalls of the chamber 21 without interfering with the rotation or desired operation of the knives or constant and continuous turbulent recirculating vortex action at least in part induced thereby.

The upper and lower rotary agitators assemblies are separately powered by their respective electric motors by conventional drive means, such as described below.

The upper and lower agitators 57 and 65 assist in mixing and recirculating material in the precomminuting chamber 21 and in directing material toward the sets of rotating precomminuting knives, and prevent the buildup of material on the interior wall surfaces of the chamber 21. The lower agitator 65, in particular, assists in urging material into the fine comminuting machine 200 after precomminution has been completed, the rotation of the sets of precomminuting knives has been stopped and the vacuum has been released.

The upper rotary agitator 57 is rotated by a drive assembly powered by means of an electric motor 60 as shown in FIG. 4. The electric motor 60 has a drive shaft which drives a first pulley 61 which in turn drives a second pulley 104 by means of a belt drive 62. The second pulley drives a horizontally extending worm drive (extending from that pulley) of the gear reducer 63 and the worm drives a worm gear of the reducer. The worm gear is affixed to and drives the vertically extending upper agitator drive shaft 64 which extends through the flat top portion 24 of the cover 22 and is sealed thereat. The upper agitator 57 is affixed to the lower end of the upper agitator drive shaft 64.

The lower rotary agitator 65 is rotated by a drive assembly powered by means of an electric motor 67 as shown in FIG. 10. The electric motor 67 has a motor drive shaft 68 that drives a first pulley 69 which in turn drives a second pulley 105 by means of a belt drive 70. The second pulley drives a horizontally extending worm drive (extending from that pulley) of a gear reducer 71 and the worm drives the worm gear of the reducer. The worm gear is affixed to and drives the vertically extending lower agitator drive shaft 72 which is rotatably mounted within the stationary, tubular mounting sleeve 73. The lower agitator is affixed to the upper end of the lower agitator drive shaft 72. A seal is positioned internally of and at the upper end of the tubular sleeve 73 between the sleeve and lower agitator drive shaft, so as to prevent material from entering the sleeve.

Referring to FIGS. 4, 10 and 11, the tubular sleeve 73 of the lower agitator assembly extends through the bottom wall portion 204 (see FIG. 10) of the neck portion 203 of the fine comminuting machine 200. A vertically and longitudinally extending partition wall 205 extends entirely across the neck portion (see FIGS. 10 and 11) and partitions the neck portion and separates the section having the tubular sleeve 73 and agitator drive shaft 72 from the remaining section of the neck portion through which precomminuted material flows from the precomminuting chamber 21. The horizontally extending drive shaft 260 for the first and second rotary propelling knives 210 and 220, respectively, and rotary discharge rotor 248 of the fine comminuting machine (see FIG. 5) is positioned (along the drive shaft center line A-A in FIG. 11) perpendicularly and in spaced relationship to the vertically extending lower agitator drive shaft 72 (see FIGS. 4, 5, 10 and 11).

FIG. 11 shows that the lower agitator drive shaft 72 is positioned centrally of the precomminuting chamber. The discharge opening 31, through which comminuted material passes from the precomminuting machine to the fine comminuting machine, is positioned somewhat to the side of that shaft. Thus, it can be seen that when precomminuted material is allowed to enter the fine comminuting machine, the lower rotary agitator 65 assists in urging such material through the discharge opening 31 into the fine comminuting machine.

The flexible, plastic wiping blades 58 and 66 of upper and agitators 57 and 65, respectively, rotate contiguous to the cylindrical side wall 29 and sloping sidewall 30. FIG. 15 shows the wiping blade 58 of the upper agitator 57 (affixed to the agitator by rivets 59) wiping the interior portion of the cylindrical sidewall 29.

The removable sealing cap 28 of the pivotal cover member 22 of the chamber 21 can be pivoted selectively to an open position, as shown in FIGS. 1 and 17, which permits material to feed into the chamber through the feed inlet 27, or to a closed operating position, as shown in FIGS. 4 and 16. With reference to FIG. 4, the reciprocating piston rod 75 of the pneumatic piston 74 is connected to an arm of the bell crank 76. The other arm of the crank 76 is connected at 78 to the laterally spaced-apart cap arms 77 (see FIGS. 1 and 4). The cap arms in turn are secured to opposite exterior sides of the cap 28. Reciprocating movement of the piston rod 75 of the piston pivots the bellcrank 76 at 78. This moves the cap arms 77 so that they either lift the cap 28 from the mouth of the feed inlet 27 or place the cap 28 in closed sealing relationship to the feed inlet.

Material can be fed to the precomminuting chamber 21 by conventional feeding means.

The particular powered pivotal feeding assembly shown in FIG. 1 comprises pivotal arms 84 which are pivotally connected at one end at 85 to the sides of the precomminuting machine and at the other end to the pivot pins 87 of the bucket carrier 86. The bucket carrier 86 carries the secured bucket 89, although the bucket can be readily detached from the carrier. When one wishes to feed material to the precomminuting chamber 21, the cap 28 is removed from the feed inlet 27, as shown in FIG. 1, the pivoted bucket carrier 86 lifts the bucket 89 toward the opened feed inlet 27. When the wheels 88 on the opposite sides of the bucket carrier 86 contact the stop arms 90, further pivotal movement of the pivotal arms 84 (further advancement of the bucket is stopped) causes the mouth of the bucket to be tilted toward the feed inlet 27 so as to discharge its contents into the chamber 21 through the inlet opening. After the bucket has been emptied, the procedure is reversed. The pivotal arms 84 pivotally lower the bucket carrier 86 to the ground, the bucket is removed from the carrier, refilled, and securely positioned on the bucket carrier. The same feeding procedure can then be repeated. The cap 28 is placed in a sealed position when feeding has been completed.

The modified, powered elevator feeding assembly shown in FIGS. 16 and 17 utilizes a chain elevator 91 which raises the bucket carrier 92 and secured in place bucket 93 vertically to the open feed inlet 27 of the precomminuting chamber 21, and then pivotally tips the mouth of the bucket 93 toward the open feed inlet 27 to discharge its contents into the chamber 21 in a manner similar to the procedure described immediately above. The bucket is lowered by the elevator and may be refilled as desired, and the feeding procedure may be repeated. The cap 28 is placed in a sealed position upon completion of the feeding operation.

The entire pivotal cover 22 of the precomminuting chamber 21 can be pivoted at 83 (see FIG. 4) selectively to either an open position in order to provide easy access to the interior of the chamber and the parts therein, or a closed operating position. Referring to FIG. 4, the reciprocating piston rod 80 of the pneumatic piston 79 is pivotally connected at 82 to the lever 81 which is connected to the cover 22. Reciprocating movement of the piston rod 80 of the piston lifts or pulls down on the lever 81 which in turn pivots the entire cover 22 at 83 to an open position away from the mouth of the cylindrical portion of the chamber or closed sealed position, depending on the direction the piston rod moves.

Although one may, if one desires, operate the precomminuting machine 20 without deaerating the chamber 21 and its contents during precomminution and without obtaining the benefits of deaeration, deaeration, including the deaeration of meat material, is preferred. When the chamber and its contents are not subjected to deaeration during precomminution, it is still desirable to seal the chamber to prevent ingress of air during precomminution, particularly during the precomminution of meat material.

After material has been fed to the precomminuting chamber 21 and the chamber has been sealed to prevent ingress of air under operating conditions, the chamber and material may be deaerated by conventional vacuumization means before and/or during comminution by the sets of rotating knives. Precomminution may be conducted, for example, by operating the precomminuting chamber, at the start of the precomminution operation, at about 10 inches of Hg (mercury) vacuum and increasing the subatmospheric conditions during precomminution. However, it is preferred to utilize at least about 15 to about 28 inches of Hg vacuum, or higher, before completing precomminution.

Referring to FIG. 1, in deaerating the precomminuting chamber 21, one may use, for example, a vacuumizing system having a vacuum pump or aspirator powered by an electric motor which are positioned within the cabinet portion 94. The vacuum pump may use water to effect aspiration on the vacuum line which is connected from the pump to the chamber 21 and to draw a vacuum on that chamber, and to seal, lubricate and cool the pump during operation. The pump is connected to a vertically extending metal pipe which in turn is connected to the lower portion of the ball-check valve 95.

The ball-check valve 95 has a cylindrical Plexiglas sight chamber with a ball therein. A wire cradle near the bottom of the Plexiglas chamber limits the downward movement of the ball so that the ball cannot seal the connection leading to the pump. When the pump motor turns off the vacuum pump, water entering the Plexiglas chamber raises the floating ball from its cradle to a water sealing position at the top of the Plexiglas chamber. The ball thus serves as a one-way valve and prevents water from further entering the system.

Referring next to FIGS. 10 and 12, in addition to FIG. 1, a flexible hose 96 having a internally positioned, flexible supporting spring connects a metal pipe which extends vertically upwardly from the top of the valve 95 to the opening 98 in the enlarged cylindrical, Plexiglas vacuum line trap 97 which is mounted on the cover 22 of the precomminuting chamber. Another, similar flexible hose 101 having an internally positioned, flexible supporting spring connects the opening 102 of the cover 22 of the precomminuting chamber 21 with the opening 99 of the trap. The trap 97 includes a press-fitted, removable, sealing cover plate 100.

The trap 97 serves to entrap any material which might backup from the chamber 21 through the connecting hose 101, and access can be gained to the confines of the trap 97 for cleaning purposes by pulling the handle of the plate 100 and removing the plate.

A vacuum gage 103 is connected to the cover 22 of the precomminuting chamber 21, and may be positioned, for example, as shown in FIG. 1. The gage measures the level of vacuum (e.g., mg./cm.$^2$, atm., or inches of Hg vacuum) in the sealed chamber.

In operating the precomminuting machine 20, one should allow a sufficient amount of material, which may be precomminuted material from a previous run, to seal the hopper 201 and thereby prevent the ingress of air thereat into the precomminuting chamber 21. (Further, the flapper valve 284 at the discharge end of the discharge nozzle 240 (see FIG. 7) of the fine comminuting machine 200 is positioned in a closed position and prevents the ingress of air thereat into that machine.) The sealing cap 28 is removed and the material to be comminuted is fed into the chamber 21 through the feed inlet 27 opening. The cap is then closed so as to seal the inlet opening. The vacuum pump may be actuated before or after starting the rotation of the sets of precomminuting knives and agitator means.

Regardless of whether the precomminuting chamber 21 and its contents are deaerated by exhausting the air (or oxygen), the rotating sets of precomminuting knives and cooperating sloping recirculating sidewall subject the material to a turbulent and constant and continuous recirculating vortex action and the material is presented and re-presented to the rotating knives and substantially thorough comminution occurs in that chamber. The rotary agitators assist in mixing and constantly and continuously recirculating material in the chamber and feeding the sets of rotary knives. The comminution takes place without requiring the presence or use of an essentially flat or horizontal bottom wall. After sufficient comminution results, which for meat material may be anywhere from about 15 seconds to 5—10 minutes, the rotation of the sets of knives is stopped (rotation of the agitators is continued and the vacuum in the precomminuting chamber is released by means of a solenoid-actuated valve) and the operation of the fine comminuting machine 200 is started. Operation of the fine comminuting machine 200 assists, to some degree, in drawing material, such as meat material, from the precomminuting chamber 21 into and through the fine comminuting machine. Operation of the lower agitator 65, in particular, assists in discharging material from the chamber. It is also desirable to continue the operation of the upper and lower rotary agitators to free the interior sidewalls of the chamber of any adhering material.

It is preferable, when one is treating meat material, to allow deaeration of the precomminuting chamber to reach at least about 15 to 28 inches of Hg vacuum, preferably at least about 20 in. of Hg vacuum, before comminution has been completed therein. If desired, one may bleed-in nitrogen gas or some other desired inert gas into the chamber before comminution has been completed in the chamber. This fluffs the meat and thereby decreases its density and softens the bit of the finished meat product.

When the precomminuting chamber 21 has been charged with comestible meat material, including highly viscous meat formulations, the chamber has been sealed against ingress of air, and comminution is conducted under deaerating (e.g., vacuumization) or negative pressure conditions, entrapped or occluded air (or oxygen) present in the meat is urged to the surface of meat particles where it is expelled, similar to the effervescence of gas bubbles through an opened bottle of champagne. The expelled air is thereafter removed from the chamber. This deaeration of the meat substantially frees it of air (or oxygen) and foams or expands meat particles, and allows the rapidly rotating precomminuting knives to subject such particles of reduced density and expanded size to an added number of subdivisions, and facilitates the ease with which individual particles can be comminuted. One would consequently expect the expanded meat particles to be more easily propelled or directed by the rotating knives and cooperating recirculating sidewall, and the particles to be subjected probably to an increased (as compared to operating without a vacuum) turbulent, recirculating vortex movement, whereby the particles would be capable of traveling in larger recirculatory paths within the chamber, which should augment the constant, continuous and vigorous movement of essentially all the material in the chamber.

The meat particles precomminuted under deaerating or subatmospheric conditions compact if or when subjected later to atmospheric conditions.

In conclusion, with the use of my precomminuting machine (which can be also referred to as a comminuting machine), either with or without such deaeration, one can expect to obtain substantially uniform precomminution of meat products in a short period of time without subjecting the meat to excessive or destructive temperatures, a result which has been considered surprising, particularly when one considers the high speed of rotation of the knives, the great driving power that rotates these knives, and the significant degree of comminution that takes place.

Outstanding results have been obtained, for example, precomminuting meat material using a sealed precomminuting chamber having associated therewith or using an intermediate portion with a cylindrical sidewall about 13½ inches high at its internal side and having an internal diameter of about 42¾ inches; a lower portion with a downwardly and inwardly sloping recirculating side wall having a height as measured along its interior sloping surface and excluding the connecting sloping hopper (e.g., sloped at about 45°) of about 15¾ inches, and having an internal diameter, at its lower interior edge (where it communicates with the sloping hopper of the fine comminuting machine) of about 20 inches; sets of powered, rotary precomminuting knives having axes of rotation positioned about 90° to said interior sloping sidewall and about 6 inches from said lower interior edge (where it communicates with the hopper) of said sloping sidewall; sets of powered, stratified, rotary precomminuting knives, each of which set (a) rotates at about 3,600 r.p.m. and (b) is powered by separate 85 horsepower motors, and includes (c) a lowermost knife member spaced about 3⅞ inches (as measured at its axis of rotation) from said interior surface of the sloping sidewall and having a tip-to-tip length (as measured through its axis of rotation) of about 15½ inches, (d) an intermediate knife member spaced about 2¾ inches from the lowermost knife (as measured along their common axis of rotation) and having a tip-to-tip length (as measured through its axis of rotation) of about 15½ inches, (e) an uppermost knife member spaced about 2⅜ inches from the intermediate knife member and having a tip-to-tip length of about 14 inches (as measured through its axis of rotation), and (f) individual knife members having a thickness of about three-fourth inch at their thickest (central) section; an upper rotary agitator which rotates at about 40 r.p.m. and is powered by about a 7½ horsepower motor; a lower rotary agitator which rotates at about 30 r.p.m. and is powered by abut a 3 horsepower motor; a vacuum pump for deaeration which is operated by about a 7½ horsepower motor; deaeration means which utilize a vacuum pump which operates up to and in the range of about 15—30 inches of Hg vacuum; and, a batch of meat material weighing about 600—650 lbs. in a precomminuting chamber that holds about 900 lbs. of meat material.

In comminuting some comestible materials (e.g., bread or cheese) in the precomminuting chamber, it may intermediate and lower portions of the chamber with a steam jacket or a jacket or a jacket into which cooling means may be circulated, so as to heat or cool the chamber.

b. FINE COMMINUTING MACHINE

The fine comminuting or emulsifying machine 200 shown in FIGS. 4 and 5 substantially conforms with the machine shown in FIGS. 2, 3, 5, 6, 9, 10 and 13 of U.S. Pat. No. 3,304,976.

The particular fine comminuting machine 200 shown in FIGS. 4—9 hereof includes, in advancing and communicating sequence, an inlet hopper 201, a comminuting chamber 202 defined by a neck portion 203 and ring portion 207, and a discharge chamber 238 with a tubular discharge nozzle 240 extending therefrom.

As explained above with respect to the precomminuting machine 20, the neck portion is divided by partition wall 205 into a section having the sleeve 73 and drive shaft 72 of the lower agitator 65 and a section though which precomminuted material passes through the discharge opening 31 of the precomminuting machine into the neck portion. This latter section is shown in FIG. 10, and is the "neck portion" referred to herein with respect to the operation of the fine comminuting machine.

The sloping recirculation sidewall 30 of precomminuting machine is mounted on and secured to the tapered feed inlet hopper 201 of the fine comminuting machine in the manner shown in FIG. 10.

Referring to FIG. 5, the neck portion 203 of the comminuting chamber 202 extends from the hopper 201 and is sealably (see the circular seal 209) connected to a ring portion 207 of that chamber at the upstream end of ring portion. The downstream end of the ring portion 207 in turn is sealably (see the circular seal 208) associated with the discharge chamber 238. The ring portion has circular seals 208 and 209 at its downstream and upstream ends, respectively. The discharge chamber has a discharge opening communicating with the inlet mouth of the tubular discharge nozzle 240 which extends outwardly therefrom and through which finely and uniformly comminuted material is discharged.

The discharge nozzle 240 shown in FIG. 7 has a circular O-ring seal 284 and hinged flapper valve 285 at its outer, discharge end. When comminuted material is not being discharged through the nozzle, gravity allows the valve 285 to seal the nozzle; the valve is pivotally opened when material is discharged through the nozzle.

Precomminuted material is discharged from the precomminuting machine through the sloping sidewall into the comminuting chamber 202 of the fine comminuting machine. The material passes from the neck portion 203 and ring portion 207 of the comminuting chamber 202 into the discharge chamber 238. Material is then discharged from the fine comminuting machine 200 though the discharge nozzle 240.

FIG. 5 shows a pair of spaced-apart, vertically disposed, flat perforate valve plates 217 and 221 of substantially similar construction. These plates are sometimes referred to herein as the first and second perforate valve plates, respectively.

The respective perforate plates 217 and 221, respectively, are provided with relatively large central openings 218 and 222 and a multiplicity of relatively small openings 219 and 223 throughout the annulus of the plates. It is desirable that the small openings 219 in the first plate 217 be relatively larger than the small openings 223 in the second plate 221 in order to allow for the passage of relatively coarser material through the first plate 217 and to facilitate the comminution. The plates 217 and 221 are mounted in the interior wall of the fine comminuting machine and are held stationary during operation of the machine by suitable means such as shear pins.

The total area of the small openings in each of the perforate plates is markedly less than the total annular area of the respective plates. This creates or produces back pressure upon material which does pass through their respective small openings. The perforate plates 217 and 221 thus serve a role as being perforate valve plates.

The fine comminuting machine shown in FIG. 5 employs two, high-speed, rotary propelling knives 210 and 220 of substantially indentical construction. These rotary knives are sometimes referred to herein as the first and second knives and cooperate with the first and second perforate valve plates, respectively. More specifically, the knives 210 and 220 are positioned adjacent perforate valve plates 217 and 221, respectively. The knives are thus positioned in contiguous or shearing relationship with their respective cooperating perforate plates during rotation, are balanced for rotation, and are positioned in the ring portion 207 of the comminuting chamber 202, and rotate along planes which are substantially at right angles to the axis of the drive shaft 260. The knives employed may be of the general type described in U.S. Pat. No. 3,044,514.

Upon rotation, the inclined face of the knife arms of the knives 210 and 220 act as a propeller which urges material toward their respective perforate valve plates 217 and 221, respectively. The trailing edges of the arms cut or shear material (at the plates) which is otherwise unable to pass through the small openings of the associated perforate valve plate (see FIG. 8).

As shown in FIGS. 6, 8 and 9 with respect to the second knife 220, knives of this type include knife arms 211 of the same construction having an outwardly or radially tapered leading cutting edge 212. The arms hold and include a suitable adjustable cutting blade 213 having a lower or trailing cutting edge 214 by means of setscrew 215.

The arms of the knives have a face which is positioned forwardly in rotation. Referring to FIG. 8, the face, in rotation, extends between the leading and trailing edges of the arms and includes an inclined propelling face 216 which slopes from the leading edge 212 toward the associated perforate plate 221 and tapers radially outwardly toward the top of the arms and to the trailing edge 214. This outward taper of the knife substantially equalizes the work done along the length of the arms and provides hydrodynamic balance.

The face of each knife, as can be seen in FIG. 8, has a changing and increasing degree of inclination relative to the axis of rotation as the face approaches the path of rotation of the trailing edge. This provides a lower pressure pocket (with an upper, substantially horizontal portion 282) which extends forwardly in rotation of the trailing cutting edge and extends along the length of that edge. The pressure pocket urges material which cannot pass through the small openings in the associated perforate valve plate and is difficult to cut into better cutting engagement with the trailing cutting edge of the knife and the small openings in the plate.

Referring to FIG. 5, the circular cup-shaped rotatable spacing disc 224 has a base portion with a central opening and a circular flange axially extending from the periphery of the base. The flanged portion is rotatably positioned within and spaced from the large central opening 218 of the first perforate valve plate 217. The second knife 220 is secured to the spacing disc by means of screws 225.

The first annular lug ring 226 shown in FIG. 2, which can be removed by removing bolts which hold it in position during operation, is mounted about and extends rearwardly (upstream) of the first knife 210 in the manner rearwardly (upstream) of the first knife 210 in the manner shown in FIG. 5 hereof and FIG. 13 of U.S. Pat. No. 3,304,976. This lug ring is provided with a sloping wall 227 having a plurality of circumferentially spaced-apart lugs 228 extending therefrom. The downstream end of the lug ring is circumferentially scalloped at 229.

The sloping wall, lugs and scalloped portions of lug ring 226 coact with the first rotary knife 210 is comminuting material and obstructing or directing its flow.

A second, removable and adjustable annular lug ring 230, as shown in FIG. 3, is positioned entirely in the ring portion 207 of the comminuting chamber intermediate the perforate valve plates 217 and 221 in the manner shown in FIG. 5 hereof and FIG. 14 of U.S. Pat. No. 3,304,976. This lug ring comprises an annular base ring 231 threadably engaged with an axially adjustable crown 232. The base ring 231 has an annular recess at its upstream end which provides a seat for the first perforate valve plate 217 and an outer circular peripheral portion positioned against the interior of the ring portion 207 of the comminuting chamber. The crown 232 has an inner inwardly sloping wall portion 233 with a plurality of circumferentially positioned, spaced-apart lugs 234 extending inwardly thereof and a second sloping wall portion 235 leading to a plurality of circumferentially positioned, spaced-apart, axially sloping fingers or hang-downs 236 extending axially therefrom and having spaces or slots therebetween. The hang-downs surround the outermost ends of the second rotating knife 220.

The base ring and crown of the adjustable lug ring 230 may be moved axially with respect to each other by rotating the threaded portions of these parts with respect to each other. This adjustment also axially adjusts the position of the first perforate valve plate 217 and the axial distance between the first and second perforate valve plates 217 and 221.

The sloping walls, lugs and hang-downs of the adjustable lug ring 230 coact with the second rotary knife 220 in comminuting material and obstructing or directing its flow. Obstructing means are positioned in the comminuting chamber rearwardly (upstream) and about the rotary knives. Thus, obstructing means assist in directing the circulation of material undergoing comminution toward the rotating knives and their respective perforate valve plates, relieve or counteract back pressure exerted by the perforate valve plates, and/or coact with the rotating knives to assist in comminuting material. The obstructing means include: lug rings 226 and 230 and their respective elements; and/or recirculating surfaces or restricted portions of the comminuting chamber, including the neck portion 203.

A venturi ring 237 is secured to the downstream end of the ring portion 207 of the comminuting chamber and is shown and described in added detail in U.S. Pat. No. 3,149,653. The venturi ring directs comminuted material centrally and increases the velocity of such material being fed to the rotary ejector blades 249 of the discharge rotor 248 which is positioned in the discharge chamber 238.

The rotary discharge rotor 248 shown in FIG. 3 has a cylindrical base portion at its upstream end which is rotatably positioned within the large central opening 222 of the second perforate valve plate 221 and is secured to the drive shaft 260. A cylindrical flanged portion of the rotor axially extends from the base portion into the discharge chamber 238 and is provided with a plurality of rotary, radially disposed, rotating ejector blades 249.

As shown in FIG. 4, a motor pulley 271 rotates the second pulley 278 secured to the drive shaft 260 by means of a belt drive 272 positioned at one end of the electric motor 270, and suitable drive means extending the motor is employed for rotating the motor pulley 271.

The rotatable drive shaft 260, extending from the pulley 278, extends through the bearing housing, indicated generally by the numeral 266, and through the real hub 279 in the neck portion 203, and into the comminuting chamber 202 and discharge chamber 238 of the machine in the manner shown in FIGS. 4 and 5. The bearing housing has a double ball bearing structure with inner bearing race portions 268 and 268' clamped to the drive shaft 260 and outer race portions 269 and 269' clamped to the bearing cage 267.

Because of the importance of preventing the ingress of air into the fine comminuting machine during its operation, two identical circular seals 206 and 206' (e.g., circular spring-load seal) positioned within the seal hub 279 surrounds the drive shaft 260 where it extends through the neck portion 203 of the comminuting chamber (see FIG. 5).

The tubular spacer sleeve 273 shown in FIG. 5 is secured at its downstream end to the first knife 210 by means of pins 274, and at its upstream end retains the circular seal 276 and that seal is held in place by a locking collar 275 having threads which engage mating threads at the upstream end of the sleeve. The sleeve positions and retains the first knife in the comminuting chamber.

Rotary knives 277 extend radially from the spacer sleeve 273, have a beveled horizontally extending cutting edges at their outer ends and are positioned in the neck portion 203. These knives cut any large chunks of material (e.g., meat) which may lodge or be placed in the neck portion and which are not subjected to desired precomminution as described above.

The drive shaft 260 has a splined section 262 and a reduced cylindrical section which forms a stud 263 with external threads adapted to receive internally threaded nut 264. Knives 210 and 220 and discharge rotor 248 are provided with centrally disposed splined openings which lock (so as to rotate with the shaft 260) with the splined section 262 of the drive shaft 260.

Rotation of drive shaft 260 by the drive means thus effects rotation of the spacer sleeve 273, high-speed propelling knives 210 and 220 and intermediate spacing disc 224, and the discharge rotor 248.

In order to adjust the axial distance of the knives 210 and 220 (as well as the discharge rotor 248) relative to their respective performance valve plates 217 and 221, the drive shaft 260 may be selectively moved in an axial direction by means of suitable worm gear means such as shown in U.S. Pat. No. 3,304,976 and FIG. 4 of U.S. Pat. No. 3,044,514.

The discharge chamber 238 is pivotally mounted so that it can be disengaged from the ring portion 207 of the comminuting chamber so as to permit access to the comminuting chamber for servicing, replacing or cleaning of parts, as well as to permit the replacement of the discharge chamber. This pivotal structure is partly shown in FIGS. 4 and 5, and in added detail in FIG. 7.

Referring to FIG. 7, the discharge chamber 238 is connected to the swivel yoke 250 by means of longitudinally extending, circumferentially spaced-apart pins 251, and the yoke is pivotally mounted (at 283) at one end onto the fixed lug 252 which is secured to the outer wall of the ring portion 207 of the comminuting chamber. The other end of swivel yoke 250 is secured to one end of a horizontally extending, adjustable rod 253 by means of a removable clevis pin 254. The other end of the rod 253 is threaded and passes through a threaded bushing 257. The bushing 257 is affixed to the exterior or wall of the ring portion 207 of the comminuting chamber. Internally threaded nut members 255 and 255' threadably engage the threaded portion of rod 253 and are disposed at each side of bushing 257. Adjustment or longitudinal movement position of the rod 253 in the bushing 257 adjusts the relative position of the rod. The nut members 255 and 255' lock the rod in place, thereby providing proper alignment of the discharge chamber 238 and the ring portion 207 of the comminuting chamber.

The discharge chamber is secured to the yoke by means of guide pins 251 and locking bolt member 256 (see FIG. 7).

Upon removal of the clevis pin 254, the swivel yoke 250 and discharge chamber 238 may be swung or pivoted from the rod 253 to an open position. This pivotal movement of the yoke allows the discharge chamber to be pivoted completely free of the outlet (downstream) end of the comminuting chamber. The yoke and discharge chamber may also be pivoted to a closed position and the clevis pin put back in place.

It is important to have an airtight seal between the various chambers of the fine comminuting machine so as to prevent the ingress of air into the machine during operation. An airtight seal is provided between the discharge chamber 238 and the comminuting chamber by axial movement or adjustment of the discharge chamber after the discharge chamber is in a closed position.

Referring to the FIG. 5, the threaded locking bolt member 256 threadably engages the internally threaded bushing 281 which is mounted against rotation in the yoke 250. The locking bolt member extends into and terminates in the circular cavity 245 at the outer extension of the discharge chamber. The cavity is formed by the circular extension flange 243 which extends axially from the outer end of the discharge chamber 238 and flanged circular plate 244 of the discharge chamber. Bolts 246 secure the circular extension flange 243 to the flanged circular plate 244. The inner end of the locking bolt member 256 which is securely retained in a circular washer 258 which is securely retained in a circular recess at the end of the bolt member. A rotatable handwheel 259 is secured to the other outer end of the locking bolt member 256.

When the discharge chamber 238 engages the ring portion 207 of the comminuting chamber and the swivel yoke 250 is closed, the airtight seal between these two chambers is accomplished by rotating the handwheel 259 to urge axially the inner end of locking bolt member 256 against the centrally dimpled, exterior portion of the end wall 247 of the discharge chamber as shown in FIG. 5. This in turn axially advances the discharge chamber 238 (see FIG. 7) into airtight engagement with the circular seal 208 (see FIG. 5) that is positioned in a circular recess at the downstream end of the ring portion 207 of the comminuting chamber.

When it is desired to disengage the discharge chamber, the handwheel 259 is rotated in the opposite direction, thereby axially moving and withdrawing the locking bolt member 256 until the washer 258 engages the flat internal base of the flanged plate 244. When the handwheel is further rotated in the same direction, the discharge chamber axially slides onto the pins 251 (see FIG. 7) to break the seal between the ring portion 207 of the comminuting chamber and the discharge chamber 238. The swivel yoke 250 then can be pivoted with the discharge chamber as explained above.

Disengagement of the discharge chamber 238 from the ring portion 207 of the comminuting chamber affords ready and complete access to the parts of the fine comminuting machine which are retained within the discharge chamber and the comminuting chamber. This facilitates assembling and disassembling of the machine and the replacement and cleaning of its parts.

Referring now to the operation of the fine comminuting machine 200, the material to be finely comminuted or emulsified is fed through the discharge opening 31 of the precomminuting machine 20 to the neck portion 203 of the comminuting chamber to the first and second, high-speed, rotary propelling knives 210 and 220 and their respective perforate valve plates 217 and 221. Obstructing means assist in recirculating material toward the knives, particularly with solid or viscous materials, and assist in comminuting the material. The knives 210 and 220 propel material centrifugally outwardly of their axes of rotation, as well as forwardly (downstream) toward their respective perforate valve plates 217 and 221. Material that advances to the trailing cutting edges of the knives and which cannot otherwise pass through the small openings in the associated perforate valve plates, is cut by the trailing cutting edges of the knives in conjunction with and at the small openings.

The perforate valve plates exert a back pressure because the plates cannot pass material as fast as it is fed to the plates. This back pressure subjects some of the material to retrograde and axially spiral movement away (upstream) from the respective plates while, at the same time, the centrifugal action of the associated knives causes material to be moved radially outwardly and toward the plates.

With respect to the first perforate valve plate 217, that plate sends material which has not passed through its small openings 219 back (upstream) and inwardly toward the axis of rotation into the neck portion 203 of the comminuting chamber (where it mixes with incoming material) and that material is subjected again to the cutting action of the first knife 210.

The second perforate valve plate 221 acts in a similar manner; however, material which is directed rearwardly (upstream) mixes with incoming material which passes through the small openings 210 in the first perforate valve plate 217.

Material is thus presented and represented to the high-speed propelling knives and associated perforate valve plates and associated obstructing means, and there is repeated mixing and comminution of material in the comminuting chamber.

The ejector blades 249 of the discharge rotor 248 assist in advancing a hydraulic column of meat material through the fine comminuting machine 200, and propel the uniformly and finely comminuted, substantially homogeneous meat material entering the discharge chamber to and through the discharge nozzle 240. The advancing material pivotally opens the hinged flapper valve 285. In addition, the fine comminuting machine assists in urging precomminuted material from the precomminuting chamber 21 into the fine comminuting machine after breaking the vacuum in chamber 21; however, the lower agitator 65, in particular, serves to urge precomminuted material toward the comminuting chamber of the fine comminuting machine.

The meat material being comminuted in the fine comminuting machine creates an air-sealing head rearwardly (upstream) of both perforate valve plates and rotating knives, and a continuously (interrupted in part by the plates) advancing hydraulic column of meat material extends to the outlet end of the discharge nozzle 240.

When the first and second perforate valve plates 217 and 221 have an outer diameter of about 225 mm. and inner diameter of about 120 mm., respectively, the knives 210 and 220 may be rotated at about 3000 r.p.m. by means of a 100 horsepower motor. With such a machine, meat material for sausage and the like which has been previously comminuted in the precomminuting machine 20 may be more uniformly and finely emulsified, and discharged as a substantially homogeneous meat emulsion at an approximate rate of about 275—600 pounds per minute.

TEST I

One hundred and seventy pounds of frozen beef for use in a wiener mix were cut in a Hydroflaker machine.

About a one-half block of a wiener mix having the 170 lbs. of cut frozen beef, 90 lbs. of beef plate, about 50 lbs. of water, 25¼ lbs. of a premix of a curing salt composition and seasonings, and 11 lbs. of salt were placed in the precomminuting chamber of the consolidated comminuting machine shown and described herein (after the hopper of the fine comminuting machine was sealed with a meat mix which had been previously precomminuted) through its feed inlet by means of a bucket having a capacity for about 350—400 lbs. of the mix. This portion of the wiener block is shown in part (A) of Table I below.

TABLE I.—604¼-LB. BLOCK OF WIENER MIX (A) About one-half block:
- 170 lbs. of cut frozen beef.
- 90 lbs. of beef plate (at about 40°F.).
- 50 lbs. of added water (at about 120°F.).
- 11 lbs. of salt (NaCl).
- 25¼ lbs. premix of Regal Peerless Deltate Wiener and Prague Powder.

346¼ lbs.

(B) Remainder of block:
- 140 lbs. of cut tempered pork jowls (at about 25–30°F.).
- 100 lbs. of added water (at tap temperature).
- 18 lbs. of GL–301 (Soy protein concentrate of U.S. Patent 2,881,076).

258 lbs.

The feed inlet of the precomminuting chamber was sealed by its cap and the machine was operated (both the upper and lower rotary agitators and both sets of high speed, counter-rotating knives were operated, although one set of knives was actuated about 7—8 seconds after the other set of knives) for a period of 30 seconds without operating the vacuum pump. During this period the temperature of part (A) of the wiener mix was measured (by a thermocouple positioned at the interior surface of the sloping sidewall and about 6 inches above where the sloping sidewall connects with the sloping hopper of the fine comminuting machine, and about 90° circumferentially from the point where the drive shafts of the two sets of precomminuting knives entered the sloping sidewall) at 10 second intervals (the drive shafts are circumferentially spaced about 180° apart). At the same time intervals, the amperage was measured of the motor (three-phrase, 60-cycle, 440-volt motor) used to power the first actuated set of precomminuting knives. The ammeter was connected to one of the motor phases.

It was noted when the ammeter readings were taken, there were amperage fluctuations during the operation. For example, when the set of rotating precomminuting knives contacted a relatively large piece of meat, the ammeter pointer would deflect sharply upward on the amperage scale for a fraction of a second. Therefore, average amperage readings were taken when the pointer remained substantially constant for about 1—2 seconds. (The motor for the knives can take a load of approximately 104 amps. and at no load the amperage requirements are about 43 amps.)

After 30 seconds of precomminution, the entire operation of the precomminuting machine was stopped and the reminder of the block, shown in part (B) of Table I above, was fed from the bucket into the precomminuting chamber through its feed inlet. The feed inlet was again sealed and the machine was operated in a similar manner for an additional 90 seconds while the vacuum pump was deaerating the chamber (the vacuum pump was actuated when the rotation of the first set of knives was started). At 10-second intervals, the level of vacuum in the chamber, and the temperature of the block and amperage readings (taken and measured as described above) were recorded.

After completion of the 90-second run, the operation of the precomminuting knives was stopped. The operation of upper and lower rotary agitators was continued, the vacuum was released, and the operation of the fine comminuting machine was then started. The fine comminuting machine discharged a uniform, fine, deaerated wiener emulsion suitable for commercial use. The operation of the fine comminuting machine and both of the rotary agitators of the precomminuting machine were stopped when there was enough meat mix left in the hopper of the fine comminuting machine to seal the lower end of the precomminuting machine for another run.

The same precomminuting and fine comminuting operations and procedure for taking readings were repeated for three additional 30-second and 90-second runs using the same feed described in Table I.

Since the temperature was about the same (within about 1° F.) at the same time intervals for each of the four runs, the temperature reading of one block was recorded at each time interval.

Table II below shows the readings taken over a 30-second period for the first portion (about one-half block) of each of the four blocks.

TABLE II.—PRECOMMINUTION OF ABOUT ONE-HALF OF EACH OF THE FOUR BLOCKS FOR 30 SECONDS

| Time in seconds | Temperature in ° F. | Amperage readings in amps for about one-half (Part (A)) of each of the four blocks of wiener mix | | | |
|---|---|---|---|---|---|
| | | First portion of Block 1 | First portion of Block 2 | First portion of Block 3 | First portion of Block 4 |
| 10 | 50 | 50 | 50 | 50 | 50 |
| 20 | 48 | 55 | 50 | 55 | 45 |
| 30 | 46 | 40 | 45 | 40 | 45 |

Table II shows that the temperature went progressively down at each 10-second interval. A comparison of the amperage readings at the 10-second and 30-second intervals shows an overall decrease (5—10-amps. decrease) for each run.

Table III below shows the readings taken when each of the four completed blocks were being precomminuted over a 90-second period while the chamber and its contents were being deaerated throughout each run.

TABLE III.—PRECOMMINUTION OF EACH OF THE FOUR BLOCKS FOR 90 SECONDS WHILE DRAWING A VACUUM
[After Precomminuting About One-Half of Each Block for 30 Seconds]

| Time in seconds | Vacuum | | Temperature in ° F. | Amperage readings in amps. for each of the four blocks of wiener mix | | | |
|---|---|---|---|---|---|---|---|
| | Kg./cm.² of vacuum | Inches of Hg vacuum | | Block 1 | Block 2 | Block 3 | Block 4 |
| 10 | 0.3 | 8.69 | 55 | 70 | 65 | 65 | 70 |
| 20 | 0.6 | 17.38 | 52 | 70 | 65 | 65 | 65 |
| 30 | 0.75 | 21.72 | 48 | 65 | 65 | 60 | 65 |
| 40 | 0.9 | 26.06 | 48 | 65 | 65 | 65 | 60 |
| 50 | 0.92 | 26.64 | 48 | 60 | 60 | 60 | 60 |
| 60 | 0.93 | 26.93 | 49 | 60 | 60 | 60 | 60 |
| 70 | 0.94 | 27.22 | 49 | 55 | 50 | 55 | 55 |
| 80 | 0.94 | 27.22 | 50 | 55 | 55 | 50 | 55 |
| 90 | 0.94 | 27.22 | 51 | 55 | 50 | 50 | 55 |

The vacuum readings shown in Table III above began to level off at about 40 30-, and were constant (27.22 inches of Hg vacuum) at the 70-second, 80-second and 90-second intervals. The temperature of the four completed blocks at any time interval changed about 0°—4° F. from the temperature obtained at an immediately preceeding 10-second interval, although the temperature at the completion (at 90 seconds) of each of the four runs was about 4° F. lower than the temperature recorded at the 10-second interval. The recorded temperature was lowest at the 30-, 40- and 50-second intervals. The amperage readings shown an overall (10—90 seconds) decrease (15 amps.) with time.

In both Table II (without a vacuum) and Table III (subjected to an increasing level of vacuum), the overall amperage readings dropped (comparison of readings at 10 seconds and at the last recorded, 90-second interval) for each run. This drop can be attributed probably to the decrease in size of the meat particles due to precomminution.

The precomminuted meat material form all runs were finely comminuted in the fine comminuting machine without ingress of air and was stuffed into skinless casings, cooked in the smokehouse, chilled and packaged for sale.

TEST 2

This test was made for purposes of comparing the operation of the consolidated comminuting machine shown and described herein and used in Test 1 above and the resulting products under conditions wherein the precomminuting apparatus was operated both without (Run 1) and with (Run 2) the vacuumization of the precomminuting chamber and contents thereof.

Amperage and temperature readings were made in the same manner and locations described in Test 1 above unless otherwise indicated in this test.

In order to control the operating conditions used in precomminution and to facilitate a comparison of the operation of the precomminuting machine both with and without the use of deaeration, the following test procedure was used:

1. The same consolidated comminuting machine was used and the precomminuting apparatus was operated for the same length of time and under the same operating conditions, except for whether deaeration was used, and temperature and amperage readings were made in the same manner;

2. The same kind and weight of wiener mix (i.e., all-meat wieners, which constitute an M.I.D. inspected product) were used. The mix did not include ice or frozen meat, so as to obviate temperature readings which could be attributed to the mere mixing of the frozen meat and ice with other relatively warmer materials present in the mix;

3. When the precomminuting chamber was deaerated, the operation of the precomminuting machine was vacuumized to a commercial level before precomminution or agitation was started, so as to obviate the obtaining of temperature and amperage readings which could be attributed merely to a significant increase of vacuum conditions during precomminution;

4. After each wiener mix was precomminuted, it was subjected to fine comminution, after which it was stuffed into skinless casings, cooked in a smokehouse, and quickly chilled or chilled in accordance with commercial conditions. The resulting, quickly chilled wieners (precomminuted with and without deaeration) were examined.

The wiener mix (meat material) used in both runs of this test was as shown in Table IV below:

TABLE IV.—604¼ LB. BLOCK OF WIENER MIX USED IN EACH OF RUNS 1 AND 2

170 lbs. of lean beef (at 36° F.).
90 lbs. of beef plate (at 36° F.).
140 lbs. of skinned pork jowls (at 33° F.).
150 lbs. of added tap water (at 50° F.).
11 lbs. of salt* (NaCl).
25¼ lbs. of premix* of Regal Peerless Wiener and Prague Powder.
18 lbs. of GL-301* (soy protein concentrate of U.S. Patent 2,881,076).

604¼ lbs.

*At room temperature, which was 60° F.

The first run, Run 1, was conducted without applying a vacuum to the precomminuting chamber. In this run, the block of meat mix shown in Table IV above was fed into the precomminuting chamber through the feed inlet, and the sealing cap was placed over the feed inlet opening. The upper and lower rotary agitators and both sets of rotary precomminuting knives (each set of precomminuting knives was driven by its own 85 horsepower electric motor) were operated during a 3-minute period, although one set of knives was rotated about 7-—8 seconds after the other set of knives. The use of this long period of precomminution assures uniform mixing of all of the ingredients of the mix, some of which ingredients had a somewhat different initial temperature. The temperature and ammeter readings were taken (in the same manner described in Test I) at 30 seconds and at every 30-second interval thereafter until the completion of the 30-second interval thereafter until the completion of the 3-minute (180-second) period of operation. (The ammeter reading of the electric motor which drives the first actuated set of knives (the motor from which all ammeter readings were taken) was about 43 amps. under no load (no material in the chamber).) Immediately after the 3-minute readings were taken, the rotation of the sets of knives and the rotary agitators was stopped. The readings obtained during the run are shown under Run 1 of Table V below.

The cover of the chamber was pivoted to an open position after completion of the run and the temperature of the precomminuted meat material was taken with a Baby Dial thermometer. This temperature reading was 71° F.

TABLE V.—PRECOMMINUTION OF WIENER MIX OF TABLE IV WITHOUT (RUN 1) AND WITH (RUN 2) DEAERATION

| Time in seconds | Run 1 (without deaeration) | | Run 2 (with deaeration) | |
| --- | --- | --- | --- | --- |
| | Temperature in° F. | Amperage readings in amps. | Temperature in° F. | Amperage readings in amps. |
| 30 | 48 | 90 | 52 | 90 |
| 60 | 47 | 80 | 52 | 80 |
| 90 | 52 | 80 | 53 | 60 |
| 120 | 56 | 70 | 54 | 60 |
| 150 | 60 | 70 | 56 | 55 |
| 180 | 65 | 70 | 57 | 55 |

The precomminuted meat material was then finely comminuted in the connected, fine comminuting apparatus and was discharged therefrom at 85° F. as a homogeneous meat emulsion. The emulsion was stuffed into skinless casings (the wieners are about 23—24 mm. in diameter and about 5½ inches long), the wieners were cooked in the smokehouse, and a few samples of the cooked wieners were quickly chilled in crushed ice for about 20 minutes and examined while the remainder of the cooked wieners were chilled in accordance with commercial practice and later packaged.

The second run, Run 2, was conducted in the same manner as described above with respect to the first run; however, the sealed precomminuting chamber was first evacuated to a vacuum of 0.9 kg.cm.² of vacuum, which corresponds to 26.06 inches of Hg vacuum, before the sets of knives and rotary agitators were started, and the vacuum pump remained in operation throughout the run and the level of vacuum remained substantially the same (about 26.06—27.22 inches of mercury vacuum) throughout the run. When 26.06 inches of mercury vacuum was initially reached, the operation of both sets of precomminuting knives and the rotary agitators was started and this operation was continued for 3 minutes. Temperature and amperage readings were taken at each 30-second interval as described above with respect to Run 1. The readings for this run, Run 2, are shown in Table V above.

Immediately after the 3-minute readings were taken, the rotation of the sets of knives and the rotary agitators were stopped and a stopcock on the cover of the chamber was opened to release the vacuum. This release of the vacuum enabled the cover then to be pivotally opened and the temperature of the precomminuted meat material in the chamber to be taken with a Baby Dial thermometer. The thermometer showed that temperature to be 64° F.

The precomminuted meat material was then finely comminuted in the same manner as the first run, and was discharged from the fine comminuting machine at 79° F. as a homogeneous meat emulsion. The emulsion was stuffed into skinless casings as described above concerning the first run and the wieners were cooked in the smokehouse. A few samples of the cooked wieners were quickly chilled in crushed ice for about 20 minutes and examined while the remaining cooked wieners were chilled in accordance with commercial practice and later packaged.

The chilled samples of cooked commercial wieners from both runs were compared. The results of this comparison are discussed later below.

Referring to Table V above, it can be seen that sometime after 60 seconds of precomminution, the power requirements of the motor for the set of precomminuting knives were less (see readings at and after the 90-second interval) when the precomminuting chamber and its contents had been deaerated (Run 2). Further, the overall temperature increase from the 30-second interval to the 180°-second interval and the temperature at 180 seconds were lower with deaeration.

It was noted that the temperature of the sidewalls of the precomminuting chamber was warmer when the second run with deaeration was made than they were at the start of the first run, since the chamber had been heated as a result of the first run. This initial, preheated condition of the chamber at the start of the second run appears to explain why the temperature of the deaerated meat material at the 30- and 60-second intervals (i.e., 52° F.) was higher than the temperatures (i.e., 47—48° F.) readings obtained at the same intervals of the first run. However, with deaeration, the temperature readings dropped sometime after 90 seconds to below the temperature readings obtained at comparable time intervals (see temperatures at the 120-, 150- and 180-second intervals) of the first run.

Still further, it is noted that there was an overall 4° F. temperature rise between the recorded 30- to 90-second intervals of the first run, and with deaeration a 1° F. temperature rise between the same recorded time intervals.

Thus, one can precomminute, with deaeration, meat material in my precomminuting machine with the use of less power and with less of a temperature rise than is obtained without the use of deaeration.

A comparison of the chilled samples of cooked wieners from both runs showed that both runs produced good products; however, the wieners made from the second run (with deaeration) appeared to have a finer and somewhat better appearance and were denser.

Observation of the ammeter dial during both runs showed that without the use of vacuum conditions, there were greater fluctuations or deflections of the ammeter pointer, indicating peak or shock loads; and, these deflections lasted longer (e.g., lasted for about 1—2 seconds) and occurred more often when deaeration was not used. These deflections are not reflected in Table V above, (As pointed out in Test 1 above, the ammeter readings (in Table V) are average readings taken when movement of the ammeter pointer was relatively stable or constant).

It was thus noted in this test that precomminuting under vacuumized conditions apparently lessened the motor load or current required to drive the precomminuting knives, or substantial precomminution took place in a shorter period of time. Further, vacuumization reduced the temperature rise of the meat material.

One may conclude from this that deaeration of the meat swells the meat particles in the precomminuting chamber to form a relatively spongy mass and thereby enables the sets of rotating precomminuting knives to cut the meat easier and with less of a motor load.

The forms of the invention herein shown and described are to be considered only as illustrative. It will be apparent to those skilled in the art that numerous modifications may be made therein without departure from the spirit of the invention or the scope of the appended claims.

I claim:

1. An apparatus for comminuting food material, which comprises: a reservoir chamber having a lower, downwardly and inwardly depending, substantially frustoconical wall which assists in directing material inwardly thereof and wherein precomminution and mixing of material occur; said reservoir chamber having upper, sealable, feed inlet means and lower outlet means for precomminuted material at the bottom of said substantially frustoconical wall which is sealable during operation; said lower outlet means being constructed to connect directly with fine comminuting means wherein fine comminuting of material occurs; said reservoir chamber also having a plurality of opposed, spaced apart, rotatable, propelling cutter means for precutting material and which are disposed interior of and adjacent to said substantially frustoconical wall and have axes of rotation substantially perpendicular to said substantially frustoconical wall, and rotary agitator means which contact the interior portion of said substantially frustoconical wall and assist in mixing material in the reservoir chamber and prevent the buildup of material on said substantially frustoconical wall.

2. The apparatus of claim 1 wherein vacuum pump means is connected to said reservoir chamber and applies a vacuum to said reservoir chamber during operation.

3. Apparatus having precomminuting means and which is suitable for comminuting food material, including meat products, which comprises:

precomminuting means having a precomminuting chamber capable of being sealed during operation and in which substantially all of the material treated in said chamber can be subjected to substantially continuous flow and precomminution;

said precomminuting chamber having associated therewith a sidewall portion; sealable, feed inlet means for receiving material to be comminuted; discharge outlet means positioned at a lower portion of said chamber which is sealable during operation; a plurality of rotary, precomminuting knife means positioned along and in spaced-apart circumferential relationship to and inwardly of said sidewall portion and positioned above said discharge outlet means; each of said knife means having at least one rotary precomminuting knife; said knife means cooperating with said sidewall portion to provide during operation a substantially constant and continuous, turbulent, recirculating vortex action to material so that there is desired representation of material to said knife means; rotary agitator means positioned along and continuous to said sidewall portion; said rotary agitator means serving to assist in mixing, recirculating, or preventing the buildup of material on said sidewall portion during operation, and to assist, upon completion of precomminution, in discharging material from said chamber through said discharge outlet means to directly connecting fine comminuting means.

4. The apparatus of claim 3 wherein: said sidewall portion has a downwardly and inwardly sloping recirculating sidewall with a slope of between about 30° to 60°; and said at least one rotary knife is positioned along and cooperates with said sloping recirculating sidewall and is driven at high speeds.

5. The apparatus of claim 4 wherein: each of said plurality of rotary knife means includes a plurality of stratified rotary precomminuting knives.

6. The apparatus of claim 4 wherein: one of said rotary knife means is rotatable in a different direction than another of said rotary knife means.

7. The apparatus of claim 4 wherein: said rotary knife means are heavy-duty rotary knife means; said rotary agitator means and rotary knife means are driven by separate motor means; and said rotary agitator means are positioned along and contiguous to said sidewall portion above and below said rotary knife means, and are heavy-duty rotary agitator means.

8. The apparatus of claim 7 wherein: said sidewall portion of the chamber includes a substantially cylindrical sidewall that extends from above said sloping recirculating sidewall to said sloping sidewall.

9. The apparatus of claim 7 wherein: said sloping recirculating sidewall has a slope of about 45°.

10. The apparatus of claim 7 wherein: said apparatus includes separately powered feeding means for feeding material into said feed inlet means.

11. Apparatus having precomminuting means and which is suitable for comminuting food material, including meat products, which comprises:

precomminuting means having a precomminuting chamber capable of being sealed during operation and in which substantially all of the material treated in said chamber can be subjected to substantially continuous flow and precomminution;

said precomminuting chamber having associated therewith a sidewall portion; sealable, feed inlet means for receiving material to be comminuted; discharge outlet means positioned at a lower portion of said chamber which is sealable during operation; a plurality of rotary, precomminuting knife means positioned along and in spaced-apart circumferential relationship to and inwardly of said sidewall portion and positioned above said discharge outlet means; said knife means cooperating with said sidewall portion to provide during operation a substantially constant and continuous, turbulent, recirculating vortex action to material so that there is desired re-presentation of material to said knife means; rotary agitator means positioned along said sidewall portion; said rotary agitator means serving to assist in mixing, recirculating, or preventing the buildup of material on said sidewall portion during operation, and to assist, upon completion of precomminution, in discharging material from said chamber through said discharge outlet means to directly connecting fine comminuting means;

deaerating means associated with said precomminuting chamber for applying at least about 15—28 inches of mercury vacuum to said chamber;

means associated with said precomminuting chamber for releasing said vacuum.

12. The apparatus of claim 11 wherein: said knife means and chamber are constructed to program precomminution with lessened power requirements when vacuum conditions are imposed upon said chamber and material therein.

13. The apparatus of claim 11 wherein: said sidewall portion has a sloping sidewall; each of said knife means comprises a set of rotary precomminuting knives; said sets of knives are positioned along and cooperate with said sloping sidewall and are separately powered, heavy-duty, high-speed, propellor-shaped knives; sets of knives have a plurality of stratified, rotary precomminuting knives and have axes of rotation substantially perpendicular to that portion of said sloping sidewall along which said sets of knives are rotated; and sets of knives are circumferentially spaced about said sloping sidewall in substantially balanced relationship to each other.

14. The apparatus of claim 13 wherein: one of said sets of knives are capable of being rotated in a different direction than another set of knives; and said sets of knives and chamber are constructed to program precomminution with lessened power requirements upon vacuumization of said chamber and material therein.

15. The apparatus of claim 14 wherein: said rotary agitator means are driven by separate motor means, are positioned along and contiguous to said sidewall portion above and below sets of knives, and are powered, heavy-duty agitator means.

16. The apparatus of claim 15 wherein: said sloping sidewall has a slope between about 30° to 60°.

17. Apparatus having precomminuting means and which is suitable for comminuting food material, including meat products, which comprises:

precomminuting means having a precomminuting chamber capable of being sealed during operation and in which substantially all of the material treated in said chamber can be subjected to substantially continuous flow and precomminution;

said precomminuting chamber having associated therewith a sidewall portion having a downwardly and inwardly sloping, circular sidewall having a slope of between 30° to 60° which serves as a recirculating baffle; removable, sealable cover means having sealable, feed inlet means for receiving material to be comminuted; discharge outlet means positioned at a lower portion of said chamber which is sealable during operation; a plurality of sets of separately powered, heavy-duty, high-speed, centrifugal, propelling, stratified, rotary, precomminuting knife means positioned along and in spaced-apart circumferential relationship to and inwardly of said sloping sidewall and positioned above said discharge outlet means and having axes of rotation substantially perpendicular to that portion of said sloping sidewall along which said sets of knife means are positioned; each of said sets of knife means having a plurality of rotary precomminuting knives in stratified relationship with respect to a common axis of rotation; one of said sets of knife means being rotatable in a different direction than another of set of knife means; said counterrotating sets of knife means directing material toward the sloping sidewall along which they are positioned and cooperating with said sloping sidewall to provide during operation a substantially constant and continuous, turbulent, recirculating vortex action to material so that there is desired re-presentation of material to said knife means; separately powered, heavy-duty, rotary agitator means positioned along and contiguous to said sidewall portion above and below said sets of knife means; said rotary agitator means serving to assist in mixing, recirculating, or preventing the buildup of material on said sloping wall during operation, and to assist, upon completion of precomminution, in discharging material from said chamber through said discharge outlet means directly into connecting fine comminuting means;

deaerating means operatively associated with said precomminuting chamber for applying at least about 15—28 inches of mercury vacuum to said chamber and removing air present in material in said chamber.

18. In precomminuting apparatus for making sausage meat emulsions: a chamber in which vacuum conditions can be maintained during operation and which is sealed against ingress of air during precomminution; said chamber having an upper, sealable feed inlet for introducing meat chunks, a lower, sealable discharge opening adapted to be sealed during operation with meat, and having a sidewall portion therebetween; said discharge opening leading to a directly connecting, fine comminuting apparatus; deaerating means operatively associated with said chamber for evacuating the chamber to a vacuum above about 20 inches of mercury vacuum; a plurality of opposed, powered, high-speed, rotatable cutter arms positioned along said sidewall portion and above said discharge opening, and constructed to be correlated with the level of vacuum so as to produce a substantial reduction in the power requirements for rotating the cutter arms, so as to produce a meat product having a dense, substantially air-free meat emulsion.

19. The apparatus of claim 18 wherein: said sidewall portion includes a sloping recirculating sidewall along which said outer arms are positioned.

20. The apparatus of claim 19 wherein: rotary agitator means are positioned along said sidewall portion to assist in mixing, recirculating, or preventing the buildup of meat on said sidewall portion and to assist in discharging precomminuted meat through the discharge opening upon completion of precomminution.

21. Precomminuting apparatus for comminuting food material, which comprises:

vacuum chamber for precomminution having a sealable feed inlet at an upper portion of the chamber and a sealable discharge opening at a lower portion of the chamber which leads to a directly connecting, fine comminuting apparatus, and having a sloping sidewall therebetween; deaeration means operatively associated with said chamber for evacuating said chamber to vacuum conditions of at least about 15 inches of mercury vacuum; a plurality of high-speed, rotary, propellor-shaped, precomminuting knives positioned along said sloping sidewall above said discharge opening; said precomminuting knives serving to comminute material and cooperating with said sloping sidewall so material is directed upwardly and back toward said precomminuting knives and in a programmed relationship after the imposition of vacuum conditions, so as to precomminute material while material is at least in part suspended in said chamber during operation with minimized pressure on the bottom portion of said chamber, to attain in said chamber a dynamic pressure of material at an upper portion of the chamber in excess of the dynamic pressure at the bottom portion of the chamber, and to attain precomminution and mixing in the chamber without a substantial rise in the temperature of the material.

22. The apparatus of claim 21 wherein: rotary agitator means are positioned within said chamber and assist in mixing material in said chamber and assist in removing material from said chamber upon completion of precomminution.

23. An apparatus for comminuting food material, which comprises: a reservoir chamber having a lower, downwardly and inwardly depending, substantially frustoconical wall which assists in directing material inwardly thereof and wherein precomminution and mixing of material occur: said reservoir chamber having upper, sealable, feed inlet means and lower outlet means for precomminuted material at the bottom of said substantially frustoconical wall which is sealable during operation; said lower outlet means communicating with fine comminuting means wherein fine comminuting of material occurs; said fine comminuting means having a high-speed, rotary propelling knife that rotates in advance of and in cooperation with a flat perforate plate, followed by ejector rotor means and discharge outlet means; said reservoir chamber also having a plurality of opposed, spaced apart, rotatable, propelling cutter means for precutting material and which are disposed interior of and adjacent to said substantially frustoconical wall and have axes of rotation substantially perpendicular to said substantially frustoconical wall, rotary agitator means which contacts the interior portion of said substantially frustoconical wall and assists in mixing material in the reservoir chamber and prevents the buildup of material on said substantially frustoconical wall, and connector means associated with said reservoir chamber suitable for connecting said reservoir chamber to vacuum pump means.

24. The apparatus of claim 23 wherein vacuum pump means is connected to said connector means of said reservoir chamber and applies a vacuum to said reservoir chamber during operation.

25. Apparatus having precomminuting and fine comminuting means and which is suitable for comminuting food material, including meat products, which comprises:

precomminuting means having a precomminuting chamber capable of being sealed during operation and in which substantially all of the material treated in said chamber can be subjected to substantially continuous flow and precomminution;

said precomminuting chamber having associated therewith a sidewall portion; sealable, feed inlet means for receiving material to be comminuted; discharge outlet means positioned at a lower portion of said chamber which is sealable during operation; a plurality of rotary, precomminuting knife means positioned along and in spaced-apart circumferential relationship to and inwardly of said sidewall portion and positioned above said discharge outlet means; said knife means cooperating with said sidewall portion to provide during operation a substantially constant and continuous, turbulent, recirculating vortex action to material so that there is desired re-presentation of material to said knife means; rotary agitator means positioned along said sidewall portion; said rotary agitator means serving to assist in mixing, recirculating, or preventing the buildup of material on said sidewall portion during operation, and to assist, upon completion of precomminution, in discharging material from said chamber through said discharge outlet means;

deaerating means associated with said precomminuting chamber capable of applying at least about 15—28 inches of mercury vacuum to said chamber;

means for selectively releasing said vacuum conditions of said precomminuting chamber;

said discharge outlet means of said precomminuting chamber directly communicating with feed inlet means of fine comminuting means;

said precomminuting chamber being capable of selectively feeding precomminuted material to said feed inlet means of said fine comminuting means;

said fine comminuting means being capable of finely comminuting material continuously, independently of and following said precomminution and without requiring the ingress of air during operation of said fine comminuting means and having said feed inlet means for selectively receiving precomminuted material discharged from said precomminuting chamber through said discharge outlet means thereof, comminuting chamber means having therein at least one, powered, heavy-duty, high-speed, centrifugal, rotary propelling knife, and discharge chamber means with discharge outlet means; said discharge outlet means providing for the discharge of finely and substantially uniformly comminuted, homogeneous material therefrom;

said apparatus, during operation, subjecting material to substantially constant and continuous recirculatory flow, precomminution and to mixing within said precomminuting chamber and subjecting material discharged from said precomminuting chamber to fine comminution by said fine comminuting means; said fine comminuting means being capable of providing a moving hydraulic column of material therein; and said precomminution and fine comminution being capable of being conducted without ingress of air during comminution and without an excessive increase of the temperature of material being treated.

26. The apparatus of claim 25 wherein: said precomminuting knife means and precomminuting chamber are constructed to program precomminution with lessened power requirements upon vacuumization of said chamber and material therein.

27. The apparatus of claim 25 wherein: each of said precomminuting knife means comprises a set of stratified, rotary precomminuting knives; and said sidewall portion includes a downwardly and inwardly sloping sidewall along which said sets of knives are positioned and with which said sets of knives cooperate.

28. Apparatus having precomminuting and fine comminuting means and which is suitable for comminuting food material, including meat products, which comprises:

precomminuting means having a precomminuting chamber capable of being sealed during operation and in which substantially all of the material treated in said chamber can be subjected to substantially continuous flow and precomminuation;

said precomminuting chamber having associated therewith a sidewall portion with a downwardly and inwardly sloping, circular sidewall having a slope of between 30° to 60° which serves as a recirculating baffle; sealable, feed inlet means for receiving material to be comminuted; discharge outlet means positioned at a lower portion of said chamber which is sealable during operation; a plurality of sets of separately powered, heavy-duty, high-speed, centrifugal, propelling, stratified, rotary, precomminuting knife means positioned along and in spaced-apart circumferential relationship to and inwardly of said sloping sidewall and positioned above said discharge outlet means and having axes of rotation substantially perpendicular to that portion of said sloping sidewall along which said sets of knife means are positioned; each of said sets of knife means having a plurality of rotary precomminuting knives in stratified relationship with respect to a common axis of rotation; one of said sets of knife means being rotatable in a direction opposite to another of said set of knife means; said counterrotating sets of knife means directing material toward the sloping sidewall along which they are positioned and cooperating with said sloping sidewall to provide during operation a substantially constant and continuous, turbulent, recirculating vortex action to material so that there is desired representation of material to said sets of knife means; separately powered, heavy-duty, rotary agitator means positioned along and contiguous to said sidewall portion above and below said sets of knife means; said rotary agitator means serving to assist in mixing, recirculating, or preventing the buildup of material on said sidewall portion during operation, and to assist, upon completion of precomminution, in discharging material from said chamber through said discharge outlet means;

deaerating means associated with said precomminuting chamber for applying at least about 15—28 inches of mercury vacuum to said chamber and removing air present in material in said chamber;

means for selectively releasing said vacuum conditions applied to said precomminuting chamber;

said discharge outlet means of said precomminuting chamber directly communicating with feed inlet means of fine comminuting means;

said precomminuting chamber being capable of selectively feeding precomminuted material to said feed inlet means of said fine comminuting means;

said fine comminuting means being capable of finely comminuting material continuously, independently of and following said precomminution and without requiring the ingress of air during operation of said fine comminuting means, and having said feed inlet means for selectively receiving precomminuted material discharged from said precomminuting chamber through said discharge outlet means thereof, comminuting chamber means having therein at least one, powered, heavy-duty, high-speed, centrifugal, rotary propelling knife, and discharge chamber means with discharge outlet means; said discharge outlet means providing for the discharge of finely and substantially uniformly comminuted, homogeneous material therefrom;

said apparatus, during operation, subjecting material to substantially constant and continuous recirculatory flow, precomminution and to mixing within said precomminuting chamber and subjecting material discharged from said precomminuting chamber to fine comminution by said fine comminuting means; said fine comminuting means being capable of providing a moving hydraulic column of material therein; and said precomminuation and fine comminution being capable of being conducted without ingress of air during comminution and without an excessive increase of the temperature of material being treated.

29. The apparatus of claim 28 wherein: said precomminuting chamber has removable, sealable cover means having said sealable, feed inlet means for receiving material to be precomminuted.

30. The apparatus of claim 29 wherein: said comminuting chamber means of the fine comminuting means includes a flat, stationary, perforate valve plate associated with the rotary propelling knife in said comminuting chamber means so that said knife operates in cooperation with and contiguous to said perforate valve plate.